US010135064B2

(12) United States Patent
Kawasato et al.

(10) Patent No.: US 10,135,064 B2
(45) Date of Patent: Nov. 20, 2018

(54) CATHODE ACTIVE MATERIAL FOR LITHIUM ION SECONDARY BATTERY

(71) Applicant: SUMITOMO CHEMICAL CO., LTD., Tokyo (JP)

(72) Inventors: Takeshi Kawasato, Tokyo (JP); Kentaro Tsunozaki, Tokyo (JP); Haisheng Zeng, Tokyo (JP); Yasuyuki Takimoto, Tokyo (JP); Toshio Suzuki, Tokyo (JP)

(73) Assignee: SUMITOMO CHEMICAL CO., LTD., Tokyo (JP)

( * ) Notice: Subject to any disclaimer, the term of this patent is extended or adjusted under 35 U.S.C. 154(b) by 646 days.

(21) Appl. No.: 14/173,032

(22) Filed: Feb. 5, 2014

(65) Prior Publication Data

US 2014/0154581 A1 Jun. 5, 2014

Related U.S. Application Data

(63) Continuation of application No. PCT/JP2012/069902, filed on Aug. 3, 2012.

(30) Foreign Application Priority Data

Aug. 5, 2011 (JP) .................................. 2011-172126

(51) Int. Cl.
*H01M 4/36* (2006.01)
*H01M 4/131* (2010.01)
(Continued)

(52) U.S. Cl.
CPC ............. *H01M 4/366* (2013.01); *B05D 1/02* (2013.01); *B05D 3/0254* (2013.01); *B82Y 30/00* (2013.01);
(Continued)

(58) Field of Classification Search
CPC ........ H01M 4/48–4/525; H01M 4/366; H01M 4/13–4/1399
See application file for complete search history.

(56) References Cited

U.S. PATENT DOCUMENTS 5,705,291 A * 1/1998 Amatucci ............. H01M 4/134
29/623.5
2005/0118511 A1 6/2005 Park et al.
(Continued)

FOREIGN PATENT DOCUMENTS

CN 101841066 A 9/2010
JP 2002-279991 9/2002
(Continued)

OTHER PUBLICATIONS

Machine Translation of JP 2002-279991, dated Jan. 21, 2002.*
(Continued)

*Primary Examiner* — Jonathan Crepeau
*Assistant Examiner* — Jacob Buchanan
(74) *Attorney, Agent, or Firm* — Oblon, McClelland, Maier & Neustadt, L.L.P.

(57) ABSTRACT

To provide a cathode active material for a lithium ion secondary battery excellent in the cycle characteristics and rate characteristics even when charging is conducted at a high voltage. A cathode active material for a lithium ion secondary battery, which comprises particles (III) having a covering layer comprising a metal oxide (I) containing at least one metal element selected from the group consisting of Al, Y, Ga, In, La, Pr, Nd, Gd, Dy, Er and Yb, and a compound (II) containing Li and at least one non-metal element selected from the group consisting of S and B, on the surface of a lithium-containing composite oxide, wherein the atomic ratio (the non-metal element/the metal (Continued)

element) contained within 5 nm of the surface layer of the particles (III) is within a specific range.

22 Claims, 2 Drawing Sheets

(51) Int. Cl.
| | |
|---|---|
| *H01M 4/139* | (2010.01) |
| *H01M 10/052* | (2010.01) |
| *C01G 53/00* | (2006.01) |
| *H01M 4/485* | (2010.01) |
| *B05D 1/02* | (2006.01) |
| *B05D 3/02* | (2006.01) |
| *B82Y 30/00* | (2011.01) |
| *H01M 4/02* | (2006.01) |

(52) U.S. Cl.
CPC ............ *C01G 53/50* (2013.01); *H01M 4/131* (2013.01); *H01M 4/485* (2013.01); *C01P 2002/72* (2013.01); *C01P 2002/85* (2013.01); *C01P 2004/61* (2013.01); *C01P 2004/80* (2013.01); *C01P 2006/12* (2013.01); *H01M 10/052* (2013.01); *H01M 2004/021* (2013.01)

(56) References Cited

U.S. PATENT DOCUMENTS

| | | | | |
|---|---|---|---|---|
| 2005/0227147 | A1* | 10/2005 | Kogetsu | H01M 4/049 429/231.95 |
| 2008/0131778 | A1* | 6/2008 | Watanabe | H01M 4/131 429/220 |
| 2009/0286155 | A1* | 11/2009 | Takehara | C01B 25/455 429/199 |
| 2010/0015509 | A1* | 1/2010 | Inagaki | H01M 4/485 429/93 |
| 2010/0028768 | A1* | 2/2010 | Morita | H01M 2/1653 429/144 |
| 2010/0233550 | A1 | 9/2010 | Yanagida et al. | |

FOREIGN PATENT DOCUMENTS

| | | |
|---|---|---|
| JP | 2005-276454 | 10/2005 |
| JP | 2006-66081 | 3/2006 |
| JP | 2006-73482 | 3/2006 |
| JP | 2007-18743 | 1/2007 |
| JP | 2010-80168 | 4/2010 |
| JP | 4582990 | 9/2010 |
| KR | 10-2005-0052216 | 6/2005 |

OTHER PUBLICATIONS

Machine Translation of JP 2005-276454, dated Oct. 6, 2005.*
U.S. Appl. No. 14/230,950, filed Mar. 31, 2014, Kawasato, et al.
U.S. Appl. No. 14/691,818, filed Apr. 21, 2015, Kawasato, et al.
U.S. Appl. No. 14/694,342, filed Apr. 23, 2015, Hardiyanto, et al.
International Search Report dated Oct. 23, 2012 in PCT/JP2012/069902 filed Aug. 3, 2012.

* cited by examiner

CATHODE ACTIVE MATERIAL FOR LITHIUM ION SECONDARY BATTERY

TECHNICAL FIELD

The present invention relates to a cathode active material for a lithium ion secondary battery and a process for its production. Further, the present invention relates to a cathode for a lithium ion secondary battery, and a lithium ion secondary battery, employing the cathode active material for a lithium ion secondary battery.

BACKGROUND ART

In recent years, lithium ion secondary batteries are widely used for portable electronic instruments such as cell phones or notebook-size personal computers. As a cathode active material for a lithium ion secondary battery, a composite oxide of lithium with a transition metal, etc. (hereinafter referred to also as a lithium-containing composite oxide material), such as $LiCoO_2$, $LiNiO_2$, $LiNi_{0.8}Co_{0.2}O_2$ or $LiMn_2O_4$, is employed.

Further, for a lithium ion secondary battery for portable electronic instruments or vehicles, it is desired to reduce the size and weight, and it is desired to further improve the discharge capacity per unit mass or such characteristics that the discharge capacity will not substantially decrease after repeating the charge and discharge cycle (hereinafter referred to also as cycle characteristics). Further, particularly in its application to vehicles, it is desired to further improve such characteristics that the discharge capacity will not decrease when discharging is conducted at a high discharge rate (hereinafter referred to also as rate characteristics). As a method for improving such cycle characteristics and rate characteristics, it has been known to be effective to provide a covering layer on the surface of a lithium-containing composite oxide particles.

Patent Document 1 discloses a method of forming a treated surface layer containing a compound represented by a chemical formula of $MXO_k$ on the surface of an active material for a lithium ion secondary battery. Here, in the formula, M is at least one member selected from the group consisting of Na, K, Mg, Ca, Sr, Ni, Co, Si, Ti, B, Al, Sn, Mn, Cr, Fe, V, Zr and combinations thereof, X is an element selected from the group consisting of P, S, W and combinations thereof, and k is a number within a range of from 2 to 4.

Further, Patent Document 2 discloses a cathode active material for a lithium ion secondary battery having a lithium compound such as $Li_2SO_4$ or $Li_3PO_4$ impregnated on the surface of a lithium-containing composite oxide. By the presence of such a lithium compound on the surface of the cathode active material, it functions as a physical barrier, whereby dissolution, into an electrolyte solution, of manganese ions in the lithium-containing composite oxide can be suppressed, and by incorporating a compound containing a bivalent metal atom (such as ZnO), it is possible to increase the valency of manganese atoms in the vicinity of the surface of the lithium-containing composite oxide, whereby elution of manganese ions can be further suppressed.

PRIOR ART DOCUMENTS

Patent Documents

Patent Document 1: Japanese Patent No. 4,582,990
Patent Document 2: JP-A-2006-73482

DISCLOSURE OF INVENTION

Technical Problems

However, in the method disclosed in Patent Document 1, it was necessary to dry a large amount of water to form the treated surface layer, and thus, the method had a problem such that not only a large energy for drying was required, but also the cathode active material was likely to agglomerate during the drying, to form coarse particles. Further, in the method of Patent Document 1, the amounts of cations and anions to form a treated surface layer were equivalent, and only a treated surface layer made of $AlPO_4$ is disclosed. Therefore, it was difficult to obtain an active material for a lithium ion secondary battery excellent in the cycle characteristics and rate characteristics.

Whereas, in the method disclosed in Patent Document 2, in addition to the lithium-containing composite oxide, a lithium compound is added, and thus, the alkali tends to be excessive. Since the alkali functions as a catalyst to decompose a carbonate as the solvent in the electrolytic solution, there was a problem that it caused generation of a gas. Further, even if a compound having a bivalent metal atom was impregnated on the cathode active material, it was not possible to obtain sufficient cycle characteristics.

The present invention has been made to overcome the above problems, and it is an object of the present invention to provide a cathode active material for a lithium ion secondary battery excellent in the cycle characteristics and rate characteristics even when charging is conducted at a high voltage, and a process for producing a cathode active material for a lithium ion secondary battery to obtain such a cathode active material, as well as a cathode for a lithium ion secondary battery, and a lithium ion secondary battery, employing such a cathode active material for a lithium ion secondary battery.

Solution to Problems

The present invention provides a cathode active material for a lithium ion secondary battery, a cathode for a lithium ion secondary battery, a lithium ion secondary battery, and a process for producing a cathode active material for a lithium ion secondary battery, having constructions of the following [1] to [13].
[1] A cathode active material for a lithium ion secondary battery, which comprises particles (III) having a covering layer comprising a metal oxide (I) containing at least one metal element selected from the group consisting of Al, Y, Ga, In, La, Pr, Nd, Gd, Dy, Er and Yb, and a compound (II) containing Li and at least one non-metal element selected from the group consisting of S and B, on the surface of a lithium-containing composite oxide comprising lithium and a transition metal element, wherein the atomic ratio of the non-metal element to the metal element (i.e. the non-metal element/the metal element) contained within 5 nm of the surface layer of the particles (III) is from 0.10 to 0.25.
[2] The cathode active material for a lithium ion secondary battery according to [1], wherein the specific surface area of the particles (III) is at least 0.1 $m^2/g$ and less than 3 $m^2/g$.
[3] A cathode active material for a lithium ion secondary battery, which comprises particles (III) having a covering layer comprising a metal oxide (I) containing at least one metal element selected from the group consisting of Al, Y, Ga, In, La, Pr, Nd, Gd, Dy, Er and Yb, and a compound (II) containing Li and at least one non-metal element selected from the group consisting of S and B, on the surface of a lithium-containing composite oxide comprising lithium and a transition metal element, wherein the atomic ratio of the non-metal element to the metal element (i.e. the non-metal element/the metal element) contained within 5 nm of the surface layer of the particles (III) is from 0.01 to 0.1, and the specific surface area of the particles (III) is at least 3 m²/g and at most 10 m²/g.

[4] The cathode active material for a lithium ion secondary battery according to any one of [1] to [3], wherein the metal element is at least one member selected from the group consisting of Al, Y, Ga, La, Gd and Er.

[5] The cathode active material for a lithium ion secondary battery according to any one of [1] to [4], wherein the compound (II) contains at least one member selected from the group consisting of $Li_2SO_4$ and $Li_2SO_4.H_2O$.

[6] The cathode active material for a lithium ion secondary battery according to any one of [1] to [5], wherein the value of the molar ratio of the metal element to the lithium-containing composite oxide is from 0.001 to 0.03.

[7] A cathode for a lithium ion secondary battery comprising the cathode active material for a lithium ion secondary battery as defined in any one of [1] to [6], and a binder.

[8] A lithium ion secondary battery comprising the cathode as defined in [7], an anode and a non-aqueous electrolyte.

[9] A process for producing a cathode active material for a lithium ion secondary battery, which comprises:

a first contact step of contacting a powder of a lithium-containing composite oxide comprising lithium and a transition metal element, and a first aqueous solution which contains a cation (p) having at least one metal element selected from the group consisting of Al, Y, Ga, In, La, Pr, Nd, Gd, Dy, Er and Yb and which does not contain an anion (n) having at least one non-metal element selected from the group consisting of S and B, a second contact step of contacting said powder of the lithium-containing composite oxide, and a second aqueous solution which contains said anion (n) (provided that the second aqueous solution may or may not contain said cation (p)), and a heating step of heating, after the first and second contact steps, the obtained treated powder of the lithium-containing composite oxide to a temperature of from 250 to 700° C., wherein in the entire aqueous solution having the first and second aqueous solutions put together, |(number of moles of said anion contained in said second aqueous solution×valency of said anion)|/((number of moles of said cation contained in said first aqueous solution×valency of said cation)+(number of moles of said cation contained in said second aqueous solution×valency of said cation)) is less than 1.

[10] The process for producing a cathode active material for a lithium ion secondary battery according to [9], wherein the first contact step and the second contact step are the same step.

[11] The process for producing a cathode active material for a lithium ion secondary battery according to [9] or [10], wherein said cation (p) contains at least one member selected from the group consisting of $Al^{3+}$, $Y^{3+}$, $Ga^{3+}$, $La^{3+}$, $Gd^{3+}$ and $Er^{3+}$, and said anion (n) contains $SO_4^{2-}$ or $BO_3^{3-}$.

[12] The process for producing a cathode active material for a lithium ion secondary battery according to any one of [9] to [11], wherein the solvent in the aqueous solutions is water only.

[13] The process for producing a cathode active material for a lithium ion secondary battery according to any one of [9] to [12], wherein in each contact step, the aqueous solution is applied by spray coating to the powder of the lithium-containing composite oxide.

Advantageous Effects of Invention

According to the present invention, it is possible to obtain a cathode active material for a lithium ion secondary battery excellent in the cycle characteristics and rate characteristics, even when charging is conducted at a high voltage.

Further, according to the process of the present invention, it is possible to produce with good productivity, a cathode active material for a lithium ion secondary battery excellent in the cycle characteristics and rate characteristics even when charging is conducted at a high voltage.

Still further, according to the cathode for a lithium ion secondary battery of the present invention, and the lithium ion secondary battery employing the cathode, it is possible to realize excellent cycle characteristics and rate characteristics, even when charging is conducted at a high voltage.

DESCRIPTION OF EMBODIMENTS

Figure 1:
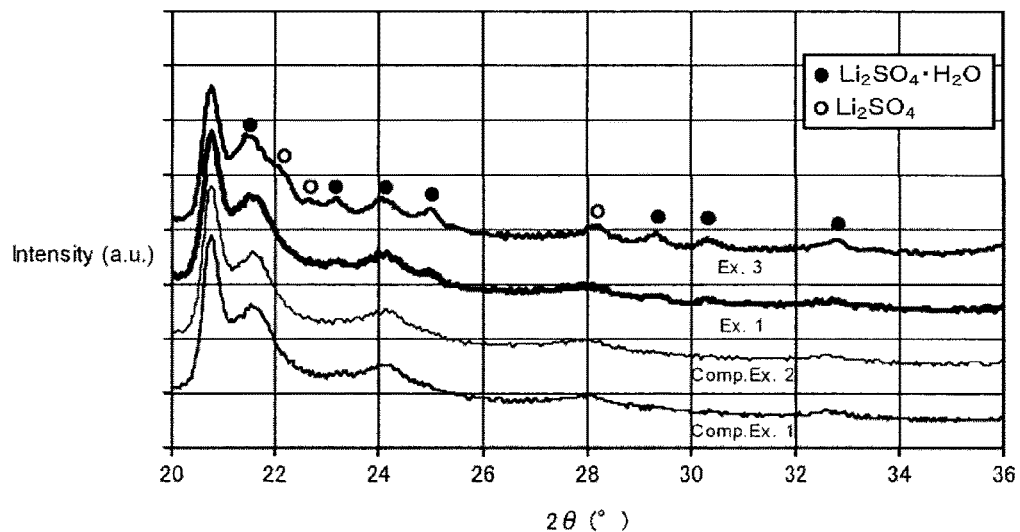
FIG. 1 is a graph showing the results of measurement of XRD (X-ray diffraction) with respect to the cathode active materials obtained in Examples 1 and 3 and Comparative Examples 1 and 2.

Cathode Active Material for Lithium Ion Secondary Battery

The cathode active material for a lithium ion secondary battery of the present invention comprises particles (III) made of a lithium-containing composite oxide comprising lithium and a transition metal element, and having a covering layer formed on the surface thereof. The covering layer comprises a metal oxide (I) containing at least one metal element selected from the group consisting of Al, Y, Ga, In, La, Pr, Nd, Gd, Dy, Er and Yb, and a compound (II) containing Li and at least one non-metal element selected from the group consisting of S and B.

In a first embodiment of the present invention, it is preferred that the atomic ratio of elements (i.e. the non-metal element/the metal element) contained within 5 nm of the surface layer of the covering layer in the particles (III) is from 0.10 to 0.25, and the specific surface area of the particles (III) is at least 0.1 m²/g and less than 3 m²/g.

In a second embodiment of the present invention, it is preferred that the atomic ratio of elements (i.e. the non-metal element/the metal element) contained within 5 nm of the surface layer of the covering layer in the particles (III) is from 0.01 to 0.1, and the specific surface area of the particles (III) is at least 3 m²/g and at most 10 m²/g.

Here, the non-metal element as the numerator of the atomic ratio is at least one non-metal element selected from the group consisting of S and B, and the metal element as the denominator is a metal element selected from the group consisting of Al, Y, Ga, In, La, Pr, Nd, Gd, Dy, Er and Yb, and does not contain Li.

Now, the lithium-containing composite oxide, the covering layer and the particles (III) having the covering layer formed on the surface of lithium-containing composite oxide particles, to constitute the cathode active material of the present invention, will be described as follows.

<Lithium-Containing Composite Oxide>

The lithium-containing composite oxide in the present invention comprises lithium and a transition metal element. The transition metal element may, for example, be at least one member selected from the group consisting of Ni, Co, Mn, Fe, Cr, V and Cu.

The lithium-containing composite oxide is, for example, preferably a compound (i) represented by the following formula (1), a compound (ii) represented by the following formula (2-1), or a compound (iii) represented by the following formula (3). One of these materials may be used alone, or two or more of them may be used in combination. From such a viewpoint that the discharge capacity is a high capacity, the compound (ii) is particularly preferred, and the compound represented by the following formula (2-2) is most preferred.

(Compound (i))

The compound (i) is a compound represented by the following formula (1).

$$Li_a(Ni_xMn_yCo_z)Me_bO_2 \qquad (1)$$

In the formula (1), Me is at least one member selected from the group consisting of Mg, Ca, Sr, Ba and Al. Further, $0.95 \leq a \leq 1.1$, $0 \leq x \leq 1$, $0 \leq y \leq 1$, $0 \leq z \leq 1$, $0 \leq b \leq 0.3$, and $0.90 \leq x+y+z+b \leq 1.05$.

Examples of the compound (i) represented by the formula (1) include $LiCoO_2$, $LiNiO_2$, $LiMnO_2$, $LiMn_{0.5}Ni_{0.5}O_2$, $LiNi_{0.5}Co_{0.2}Mn_{0.3}O_2$, $LiNi_{0.85}Co_{0.10}Al_{0.05}O_2$ and $LiNi_{1/3}Co_{1/3}Mn_{1/3}O_2$.

(Compound (ii))

The compound (ii) is a compound represented by the following formula (2-1). The representation of the compound represented by the formula (2-1) is a composition formula prior to conducting treatment such as charge and discharge, or activation. Here, the activation is meant for removal of lithium oxide ($Li_2O$), or lithium and lithium oxide, from the lithium-containing composite oxide. As a usual activation method, an electrochemical activation method may be mentioned wherein charging is conducted at a voltage larger than 4.4 V or 4.6 V (a value represented as a potential difference from the oxidation-reduction potential of $Li^+/Li$). Further, an activation method may be mentioned which is conducted chemically by carrying out a chemical reaction employing an acid such as sulfuric acid, hydrochloric acid or nitric acid.

$$Li(Li_xMn_yMe'_z)O_pF_q \qquad (2-1)$$

In the formula (2-1), Me' is at least one member selected from the group consisting of Co, Ni, Cr, Fe, Al, Ti, Zr and Mg. Further, $0.09<x<0.3$, $y>0$, $z>0$, $1.9<p<2.1$, $0 \leq q \leq 0.1$ and $0.4 \leq y/(y+z) \leq 0.8$, $x+y+z=1$, and $1.2<(1+x)/(y+z)$. That is, in the compound represented by the formula (2-1), the proportion of Li exceeds 1.2 times by mol to the total of Mn and Me'. Further, the formula (2-1) is characterized also in that it represents a compound containing a specific amount of Mn, and the proportion of Mn to the total amount of Mn and Me' is preferably from 0.4 to 0.8, more preferably from 0.55 to 0.75. When Mn is within such a range, the discharge capacity becomes to be a high capacity. Here, q represents the proportion of F, but when F is not present, q is 0. Further, p is a value determined depending upon x, y, z and q and is from 1.9 to 2.1.

In a case where the lithium-containing composite oxide is a compound represented by the formula (2-1), the composition ratio of Li element to the total molar amount of the transition metal elements is preferably $1.25 \leq (1+x)/(y+z) \leq 1.75$, more preferably $1.35 \leq (1+x)/(y+z) \leq 1.65$, particularly preferably $1.40 \leq (1+x)/(y+z) \leq 1.55$. When this composition ratio is within such a range, it is possible to obtain a cathode material having a high discharge capacity per unit mass, when a high charging voltage of at least 4.6 V is applied.

As the compound (ii), a compound represented by the following formula (2-2) is more preferred.

$$Li(Li_xMn_yNi_vCo_w)O_p \qquad (2-2)$$

In the formula (2-2), $0.09<x<0.3$, $0.36<y<0.73$, $0<v<0.32$, $0<w<0.32$, $1.9<p<2.1$, and $x+y+v+w=1$.

In the formula (2-2), the composition ratio of Li element to the total of Mn, Ni and Co elements is $1.2<(1+x)/(y+v+w)<1.8$, preferably $1.35<(1+x)/(y+v+w)<1.65$, more preferably $1.45<(1+x)/(y+v+w)<1.55$.

As the compound (ii), particularly preferred is

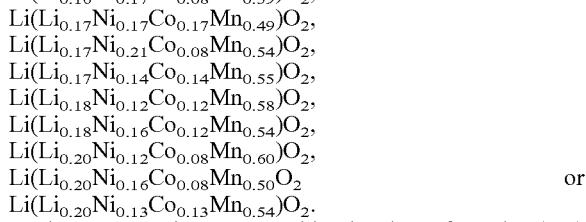

$Li(Li_{0.16}Ni_{0.17}Co_{0.08}Mn_{0.59})O_2$,
$Li(Li_{0.17}Ni_{0.17}Co_{0.17}Mn_{0.49})O_2$,
$Li(Li_{0.17}Ni_{0.21}Co_{0.08}Mn_{0.54})O_2$,
$Li(Li_{0.17}Ni_{0.14}Co_{0.14}Mn_{0.55})O_2$,
$Li(Li_{0.18}Ni_{0.12}Co_{0.12}Mn_{0.58})O_2$,
$Li(Li_{0.18}Ni_{0.16}Co_{0.12}Mn_{0.54})O_2$,
$Li(Li_{0.20}Ni_{0.12}Co_{0.08}Mn_{0.60})O_2$,
$Li(Li_{0.20}Ni_{0.16}Co_{0.08}Mn_{0.50})O_2$ or
$Li(Li_{0.20}Ni_{0.13}Co_{0.13}Mn_{0.54})O_2$.

The compounds represented by the above formulae (2-1) and (2-2) are preferably ones taking a layered rock salt type crystal structure (space group R-3m). Further, the ratio of the Li element to the transition metal element is high, whereby in the XRD (X-ray diffraction) measurement using CuKα ray as the X-ray source, a peak is observed within a range of $2\theta=20$ to $25°$ like layered $Li_2MnO_3$.

(Compound (iii))

The compound (iii) is a compound represented by the following formula (3).

$$Li(Mn_{2-x}Me''_x)O_4 \qquad (3)$$

In the formula (3), Me'' is at least one member selected from the group consisting of Co, Ni, Fe, Ti, Cr, Mg, Ba, Nb, Ag and Al. $0 \leq x < 2$. The compound (iii) may, for example, be $LiMn_2O_4$, $LiMn_{1.5}Ni_{0.5}O_4$, $LiMn_{1.0}Cu_{1.0}O_4$, $LiMn_{1.85}Al_{0.15}O_4$ or $LiMn_{1.9}Mg_{0.1}O_4$.

The lithium-containing composite oxide in the present invention is in the form of particles. The shape of the particles is not particularly limited and may be spherical, needle-form, plate-form or the like. However, it is preferably spherical, since it is thereby possible to increase a filling ability. Further, a plurality of such particles may be agglomerated to form secondary particles, and also in such a case, spherical secondary particles are preferred, which are capable of increasing the filling ability. The average particle size D50 is preferably from 0.03 to 30 μm, more preferably from 0.04 to 25 μm, particularly preferably from 0.05 to 20 μm.

In the present invention, the average particle size D50 means a volume-based accumulative 50% size which is a particle size at a point of 50% on an accumulative curve when the accumulative curve is drawn by obtaining the particle size distribution on the volume basis and taking the whole to be 100%. The particle size distribution is obtained from the frequency distribution and accumulative volume distribution curve measured by means of a laser scattering particle size distribution measuring apparatus. The measurement of particle sizes is carried out by sufficiently dispersing the powder in an aqueous medium by e.g. an ultrasonic treatment and measuring the particle size distribution, for example, by means of a laser diffraction/scattering type particle size distribution measuring apparatus (trade name: Partica LA-950VII), manufactured by HORIBA, Ltd.

In the present invention, the average particle size (D50) of the lithium-containing composite oxide is preferably from 3 to 30 µm, more preferably from 4 to 25 µm, particularly preferably from 5 to 20 µm.

The specific surface area of the lithium-containing composite oxide in the present invention is preferably from 0.1 to 10 $m^2/g$, particularly preferably from 0.15 to 5 $m^2/g$. When the specific surface area of the lithium-containing composite oxide is from 0.1 to 10 $m^2/g$, it is possible to form a dense cathode layer having a high discharge capacity. Here, the specific surface area is a value measured by means of a BET (Brunauer, Emmett, Teller) method.

In a case where the lithium-containing composite oxide is the compound (i) or the compound (iii), the specific surface area is preferably from 0.1 to 3 $m^2/g$, more preferably from 0.2 to 2 $m^2/g$, particularly preferably from 0.3 to 1 $m^2/g$. In a case where the lithium-containing composite oxide is the compound (ii), the specific surface area is preferably from 1 to 10 $m^2/g$, more preferably from 2 to 8 $m^2/g$, particularly preferably from 3 to 6 $m^2/g$.

A method for producing the lithium-containing composite oxide may, for example, be a method wherein a lithium compound and a precursor for a lithium-containing composite oxide obtained by a coprecipitation method, are mixed and fired, a hydrothermal synthesis method, a sol-gel method, a dry blending method (solid phase method), an ion exchange method or a glass crystallization method. However, preferred is a method wherein a lithium compound and a precursor for a lithium-containing composite oxide obtained by a coprecipitation method (coprecipitated composition) are mixed and fired, whereby transition metal elements will be uniformly contained, so that the discharge capacity will be excellent.

As the coprecipitation method, specifically an alkali coprecipitation method and a carbonate coprecipitation method are preferred. In this specification, the alkali coprecipitation method is a method wherein a transition metal salt aqueous solution and a pH adjusting agent containing a strong alkali are continuously added to a reaction solution to form a transition metal hydroxide. The carbonate coprecipitation method is a method wherein a transition metal salt aqueous solution and a carbonate aqueous solution are continuously added to a reaction solution to form a transition metal carbonate.

In the present invention, in the first embodiment, it is preferred to use a lithium-containing composite oxide produced from a precursor obtainable by the alkali coprecipitation method. From the precursor obtainable by the alkali coprecipitation method, a cathode material which has a high powder density and may be highly filled in a battery, can be obtained. In the present invention, in the second embodiment, it is preferred to use a lithium-containing composite oxide produced from a precursor obtainable by a carbonate coprecipitation method. From the precursor obtainable by a carbonate coprecipitation method, a cathode material which is porous and has a high specific surface area and which also has a very high discharge capacity, can be obtained.

In the alkali coprecipitation method, the pH of the reaction solution is preferably from 10 to 12. The pH adjusting agent to be added, is preferably an aqueous solution containing, as a strong alkali, at least one compound selected from the group consisting of sodium hydroxide, potassium hydroxide and lithium hydroxide. Further, an ammonia aqueous solution or an ammonium sulfate aqueous solution may, for example, be added to the reaction solution.

In the carbonate coprecipitation method, the pH of the reaction solution is preferably from 7 to 9. The carbonate aqueous solution is preferably an aqueous solution containing at least one compound selected from the group consisting of sodium carbonate, potassium carbonate and potassium hydrogencarbonate. Further, an ammonia aqueous solution or an ammonium sulfate aqueous solution may, for example, be added to the reaction solution.

<Covering Layer>

The covering layer in the present invention is a layer formed on the surface of particles of the lithium-containing composite oxide and comprises a metal oxide (I) having at least one metal element selected from the group consisting of Al, Y, Ga, In, La, Pr, Nd, Gd, Dy, Er and Yb, and a compound (II) having Li and at least one non-metal element selected from the group consisting of S and B.

In the first embodiment of the present invention, the atomic ratio of elements (i.e. the non-metal element/the metal element) contained within 5 nm of the surface layer of the covering layer in the particles (III) is from 0.10 to 0.25.

In the second embodiment of the present invention, the atomic ratio of elements (i.e. the non-metal element/the metal element) contained within 5 nm of the surface layer of the covering layer in the particles (III) is from 0.01 to 0.10.

Here, "covering" means a state chemically or physically adsorbed on a part or whole of the surface of the lithium-containing composite oxide particles, and a layer so "covering" is referred to as a "covering layer".

(Metal Oxide (I))

The metal oxide (I) in the present invention contains at least one metal element selected from the group consisting of Al, Y, Ga, In, La, Pr, Nd, Gd, Dy, Er and Yb. The metal element is preferably at least one metal element selected from the group consisting of Al, Y, Ga, La, Gd and Er, more preferably at least one metal element selected from the group consisting of Al and Y.

Specifically, the metal oxide (I) may, for example, be $Al_2O_3$, $Y_2O_3$, $Ga_2O_3$, $In_2O_3$, $La_2O_3$, $Pr_2O_3$, $Nd_2O_3$, $Gd_2O_3$, $Dy_2O_3$, $Er_2O_3$ or $Yb_2O_3$. Among them, $Al_2O_3$, $Y_2O_3$, $Gd_2O_3$ or $Er_2O_3$ is preferred, and $Al_2O_3$ is particularly preferred, since it is thereby possible to form an electrochemically stable oxide coating film, and the after-described discharge capacity, rate characteristics and cycle characteristics of the lithium ion secondary battery will be excellent. The metal oxide (I) in the present invention may contain one or more of such metal oxides.

(Compound (II))

The compound (II) in the present invention contains Li and at least one non-metal element selected from the group consisting of S and B.

The compound (II) is preferably $Li_2SO_4$, $Li_3BO_3$, $Li_2B_4O_7$ or their hydrates, more preferably $Li_2SO_4$ or $Li_2SO_4 \cdot H_2O$. The compound (II) may contain one or more of such compounds.

Further, the covering layer may contain $Na_2SO_4$, $Na_3BO_3$, $Na_2SO_4$, $Na_2B_4O_7$, $NaBO_2$ or their hydrates.

The metal oxide (I) in the covering layer may be crystalline or non-crystalline, preferably non-crystalline. Here, non-crystalline means that no peak attributable to the covering layer is observed in the XRD measurement. The reason for the preference is not clear, but is considered to be such that when the covering layer is non-crystalline, the covering layer tends to easily elute to the electrolytic solution, whereby the covering layer functions as a sacrifice layer. That is, it is considered that, as the covering layer elutes to the electrolytic solution, elution to the electrolytic solution, of the transition metal element such as Mn in the surface of the lithium-containing composite oxide will be suppressed, whereby the cycle characteristics will be improved.

On the other hand, the compound (II) containing Li and at least one non-metal element selected from the group consisting of S and B, in the covering layer, is preferably crystalline. The reason for the preference is not clear, but is considered to be such that the crystalline compound tends to bring about higher mobility of lithium ions, whereby lithium diffusivity along with charge and discharge will be improved, and the charge and discharge efficiency and the rate characteristics will be improved.

Further, the covering layer may be one formed by collection of fine particles chemically or physically adsorbed. In a case where the covering layer is to be formed by collection of fine particles, the average particle size of the fine particles is preferably from 0.1 to 100 nm, more preferably from 0.1 to 50 nm, particularly preferably from 0.1 to 30 nm. Here, the average particle size is represented by an average value of diameters of fine particles which cover the surface of the lithium-containing composite oxide particles. The shape of the covering layer and the average particle size of the fine particles can be measured and evaluated by an electron microscope such as SEM (scanning electron microscope) or TEM (transmission electron microscope).

In the present invention, by such a covering layer, it is considered possible to reduce the contact of the lithium-containing composite oxide and the electrolytic solution, whereby it is possible to suppress elution of a transition metal such as Mn to the electrolytic solution from the surface of the lithium-containing composite oxide and thereby to improve the cycle characteristics. Further, by the covering layer, it is possible to suppress deposition of decomposition products of the electrolytic solution on the surface of the lithium-containing composite oxide, whereby it is considered possible to improve the rate characteristics.

<Particles (III) as Cathode Active Material>

The cathode active material for a lithium ion secondary battery of the present invention is particles (III) having a structure wherein the surface of the lithium-containing composite oxide particles is covered by the covering layer.

The shape of the particles (III) may be any of a spherical-form, a film-form, a fiber-form, an agglomerated form, etc. In a case where the particles (III) is a spherical-form, the average particle size of the particles (III) is preferably from 3 to 30 μm, more preferably from 4 to 25 μm, particularly preferably from 5 to 20 μm.

The covering layer may cover at least a part of the surface of the lithium-containing composite oxide particles. Further, the particles (III) are preferably particles in which a part or whole of the surface of the lithium-containing composite oxide particles is covered by the covering layer made of a non-crystalline and crystalline mixture. Particularly preferred is a mixture wherein the metal oxide (I) is non-crystalline and the compound (II) is crystalline.

In the particles (III), the state where the covering layer is formed on the surface of the lithium-containing composite oxide particles, can be evaluated, for example, by polishing the cross-section after cutting the particles (III) and carrying out element mapping by an X-ray microanalyzer method (EPMA).

In the particles (III), the content (molar amount) of the metal elements in the covering layer as calculated from the feeding amount of the raw material, is preferably a proportion of from 0.001 to 0.03, more preferably a proportion of from 0.005 to 0.02, particularly preferably a proportion of from 0.01 to 0.015, to the molar amount of the lithium-containing composite oxide as the base material. Within such a range, a cathode active material having a large discharge capacity and being excellent in the rate characteristics and cycle characteristics, can be obtained.

The amount (molar amount) of metal elements present in the covering layer of the particles (III) can be measured by dissolving the particles (III) as a cathode active material in an acid and conducting an ICP (high frequency inductively-coupled plasma) measurement. Here, in a case where it is not possible to obtain the amount of metals present in the covering layer by the ICP measurement, it may be calculated based on e.g. the amounts of metal elements in the aqueous solution at the time of the production as described hereinafter.

In the first embodiment of the present invention, the atomic ratio of elements (i.e. the non-metal element/the metal element) contained within 5 nm of the surface layer of the particles (III) is from 0.10 to 0.25. This atomic ratio is preferably from 0.15 to 0.20, whereby the compound (II) having the non-metal element not contributing to development of the capacity, is small in amount, and excellent rate characteristics are obtainable. The specific surface area is preferably at least 0.1 $m^2/g$ and less than 3 $m^2/g$, more preferably at least 0.5 $m^2/g$ and less than 3 $m^2/g$, particularly preferably at least 1 $m^2/g$ and less than 3 $m^2/g$, whereby it is possible to readily obtain a cathode material capable of realizing a high capacity and high filling properties.

In the second embodiment of the present invention, the atomic ratio of elements (i.e. the non-metal element/the metal element) contained within 5 nm of the surface layer of the particles (III) is from 0.01 to 0.1. This atomic ratio is preferably from 0.01 to 0.08, whereby the compound (II) having the non-metal element not contributing to development of the capacity, is small in amount, and excellent rate characteristics are obtainable. The specific surface area is preferably at least 3 $m^2/g$ and at most 10 $m^2/g$, more preferably at least 3 $m^2/g$ and at most 8 $m^2/g$, particularly preferably at least 4 $m^2/g$ and at most 6 $m^2/g$, whereby it is possible to readily obtain a cathode material capable of realizing a very high capacity and high durability.

In the present invention, the atomic ratio (i.e. the non-metal element/the metal element) within 5 nm of the surface layer of the particles (III) can easily be analyzed by an XPS (X-ray photoelectron spectroscopic) analysis. By using the XPS analysis, it is possible to analyze the types of elements or the proportions of elements contained in a layer very close to the surface of the particles. Here, an example of the XPS analyzer may be ESCA Model 5500 manufactured by PHI.

At the time of calculating an atomic ratio by using the XPS analysis in the present invention, it is preferred to use, for the calculation, peaks which can be detected with a high sensitivity and which do not overlap with peaks of other elements as far as possible. Specifically, at the time of analyzing metal elements and non-metal elements, it is preferred to use 2P peaks having a high sensitivity.

Here, it is considered that in the particles (III) in the present invention, the manner of distribution of the compound (II) containing Li and at least one non-metal element selected from the group consisting of S and B, is different between a case where pores are less in secondary particles and a case where many pores are present in porous secondary particles.

In the first embodiment of the present invention, it is considered that the specific surface area of the particles (III) is small, and pores therein are less, whereby it is considered that the compound (II) is present in a larger amount at the surface of the secondary particles of the particles (III).

In the second embodiment of the present invention, it is considered that the specific surface area of the particles (III) is large and many pores are present therein, whereby it is considered that the compound (II) is present in a larger amount inside thereof rather than at the surface of the secondary particles of the particles (III).

In the particles (III) in the present invention, it is preferred that the non-metal element in the compound (II) has a concentration gradient such that its concentration gradually decreases from the surface of the particles (III) towards the center. It is considered that in the particles (III), the non-metal element in the covering layer diffuses to the inside of the lithium-containing composite oxide, whereby the mobility of lithium is improved so that introduction or removal of lithium is facilitated.

The state where the non-metal element has a concentration gradient in the particles (III), can be confirmed, for example, by the above-mentioned XPS analysis while carrying out etching by e.g. argon ions.

The particles (III) in the present invention are capable of reducing the free Li ratio. In this specification, the free Li ratio means a ratio of the total of Li amounts contained in LiOH and $Li_2CO_3$ eluted to water, to the Li amount contained in 1 g of the cathode active material.

The free Li ratio can be obtained by the following procedure.

1 g of the particles (III) is dispersed in water and filtered, and then, the initial pH of the filtrate is measured. Then, with respect to the filtrate, titration is carried out by e.g. hydrochloric acid. In the titration, on the assumption that the titer from the initial pH to pH 8.5 corresponds to neutralization of LiOH and $Li_2CO_3$, and the titer from pH 8.5 to pH 4.0 corresponds to neutralization of $Li_2CO_3$, the contents of LiOH and $Li_2CO_3$ contained in the filtrate are obtained.

The free Li ratio in the particles (III) is preferably from 0.1 to 1.0 mol %, more preferably from 0.2 to 0.8 mol %. When the free Li ratio is within such a range, at the time of preparing the after-mentioned slurry of an electrically conductive material and a binder, a viscosity increase or gelation of the slurry is less likely to occur, such being preferred from the viewpoint of handling efficiency during the production.

In the cathode active material for a lithium ion secondary battery of the present invention, the covering layer comprises the metal oxide (I) and the compound (II), and the atomic ratio of elements (the non-metal element/the metal element) contained within 5 nm of the surface layer, is adjusted to be within the specific range, whereby the discharge capacity, rate characteristics and cycle characteristics are improved. The reason for such improvements is not clearly understood, but is considered to be such that the compound (II) in the covering layer is a compound having an ionic bond, whereby as compared with e.g. a covering layer composed solely of a metal oxide or the like wherein no ionically-bonded compound is present, the mobility of lithium ions is improved, and the battery characteristics are improved. Further, the compound (II) is formed by withdrawing lithium in the lithium-containing composite oxide, whereby there will be no excessive alkali such as lithium present, and it is possible to suppress formation of a gas due to decomposition of a solvent in the electrolytic solution.

Further, the covering layer contains the metal oxide (I), whereby it is possible to form an oxide film which is electrochemically stable, and in a case where e.g. $LiPF_6$ is used as the after-described electrolyte, HF to be formed by decomposition of $LiPF_6$ can be reacted with and consumed by the metal oxide (I) in the covering layer. Accordingly, the cycle characteristics will be improved. Here, a stable oxide film means a compound having a strong bonding property to oxygen and can be compared by Gibbs free energy values. In general, rather than a bivalent metal oxide, a trivalent metal oxide has a smaller Gibbs free energy value (negatively larger) and is more stable.

Further, it is considered that the rate characteristics are improved, since it is possible to suppress deposition of decomposition products of the electrolytic solution on the surface of the lithium-containing composite oxide. Furthermore, by adjusting the atomic ratio (the non-metal element/the metal element) to be within the specific range, it is possible to improve the rate characteristics and cycle characteristics without lowering the discharge capacity.

The process for producing the cathode active material for a lithium ion secondary battery of the present invention is not particularly limited, and for example, it can be produced by the following process.

[Process for Producing Cathode Active Material for Lithium Ion Secondary Battery]

The process for producing a cathode active material for a lithium ion secondary battery of the present invention comprises a first contact step of contacting a powder of a lithium-containing composite oxide comprising lithium and a transition metal element, and a first aqueous solution which contains a cation (p) having at least one metal element selected from the group consisting of Al, Y, Ga, In, La, Pr, Nd, Gd, Dy, Er and Yb and which does not contain an anion (n) having at least one non-metal element selected from the group consisting of S and B, a second contact step of contacting said powder of the lithium-containing composite oxide, and a second aqueous solution which contains said anion (n) (provided that the second aqueous solution may or may not contain said cation (p)), and a heating step of heating, after the first and second contact steps, the obtained treated powder of the lithium-containing composite oxide to a temperature of from 250 to 700° C.

And, the process is characterized in that in the entire aqueous solution having the first and second aqueous solutions put together, |(number of moles of said anion contained in said second aqueous solution×valency of said anion|/((number of moles of said cation contained in said first aqueous solution×valency of said cation)+(number of moles of said cation contained in said second aqueous solution×valency of said cation)) is less than 1.

In this specification, a "powder" means a collection of individual particles. That is, in the first or second contact step of the present invention, the first aqueous solution or the second aqueous solution is contacted with a powder made of a collection of the lithium-containing composite oxide particles.

By such a production process, it is possible to form a covering layer comprising the metal oxide (I) and the compound (II), on the surface of the particles of the lithium-containing composite oxide. And, it is possible to produce, with good productivity, the cathode active material for a lithium ion secondary battery excellent in the cycle characteristics and rate characteristics even when charging is carried out at a high voltage.

Now, the respective steps will be described.

<First Contact Step and Second Contact Step>

The first contact step is to contact a powder of the lithium-containing composite oxide and a first aqueous solution which contains a cation (p) having at least one metal element selected from the group consisting of Al, Y, Ga, In, La, Pr, Nd, Gd, Dy, Er and Yb. The second contact step is to contact said powder of the lithium-containing composite oxide, and a second aqueous solution which contains an anion (n) having at least one non-metal element selected from the group consisting of S and B and which does not contain said cation (p).

Here, as will be mentioned later, the first contact step and the second contact step may be separate steps or may be the same step. That is, the first aqueous solution and the second aqueous solution may be contacted with the lithium-containing composite oxide simultaneously, or the first aqueous solution and the second aqueous solution may be preliminarily mixed and then contacted with the composite oxide.

(Lithium-Containing Composite Oxide)

As the lithium-containing composite oxide, the above-described lithium-containing composite oxide may be used, and the preferred embodiment may also be the same.

(First Aqueous Solution and Second Aqueous Solution)

The first aqueous solution to be used in the first contact step contains a cation (p) having at least one metal element selected from the group consisting of Al, Y, Ga, In, La, Pr, Nd, Gd, Dy, Er and Yb and does not contain an anion (n) having at least one non-metal element selected from the group consisting of S and B.

The cation (p) may be. $Al^{3+}$, $Y^{3+}$, $Ga^{3+}$, $In^{3+}$, $La^{3+}$, $Pr^{3+}$, $Nd^{3+}$, $Gd^{3+}$, $Dy^{3+}$, $Er^{3+}$ or $Y^{3+}$, as an ion of the above metal element, or may be a complex ion having the above metal element, but it is preferably an ion of the above metal element from the viewpoint of the reactivity with the after-described anion (n). As the cation (p), $Al^{3+}$ or $Y^{3+}$ is preferred in that a stable coating film can be formed, the molecular weight of the cation is small, and the discharge capacity per unit mass of the after-described lithium ion secondary battery, rate characteristics and cycle characteristics will be excellent.

Further, the first aqueous solution may contain cations which will be decomposed and evaporated by heating, such as $H^+$, $NH_4^+$, etc. in addition to the cation (p). Here, in this specification, "will be decomposed and evaporated by heating" means that when heated to from 250 to 700° C. in the after-described heating step, the object will be decomposed and evaporated and will not remain in the covering layer.

The second aqueous solution to be used in the second contact step (provided that the second aqueous solution may or may not contain said cation (p)) contains an anion (n) having at least one non-metal element selected from the group consisting of S and B.

Such an anion (n) may, for example, be $SO_4^{2-}$, $SO_3^{2-}$, $S_2O_3^{2-}$, $BO_6^{2-}$, $BO_8^{2-}$, $BO_3^{3-}$, $BO_2^-$, $B_4O_7^{2-}$ or $B_5O_8^-$. Each of such anions (n) will not be decomposed or evaporated by heating and will become $SO_4^{2-}$ or $BO_3^{3-}$ in a stable oxide state.

Further, the second aqueous solution may contain anions which will be decomposed and evaporated by heating, such as $OH^-$, $NO_3^-$, $CO_3^{2-}$, etc. in addition to the anion (n) having the above non-metal element.

The first aqueous solution can be obtained by dissolving a water-soluble compound containing the above metal element (hereinafter referred to as the water-soluble compound (1)) in distilled water or the like, as a solvent (the solvent will be described later). Further, the second aqueous solution can be obtained by dissolving a water-soluble compound containing the above non-metal element (hereinafter referred to as the water-soluble compound (2)) in distilled water or the like, as a solvent (the solvent will be described later).

Here, the "water-soluble" in the above water-soluble compound means that the solubility (the mass [g] of a solute dissolved in 100 g of a saturated solution) in distilled water at 25° C. is more than 2. When the solubility is more than 2, it is possible to increase the amount of the water-soluble compound in the aqueous solution, whereby it is possible to efficiently form a covering layer. The solubility of the water-soluble compound is more preferably more than 5, particularly preferably more than 10.

The water-soluble compound (1) is preferably a compound having the above metal element combined with an anion which will be decomposed and evaporated by heating, and for example, an inorganic salt such as a nitrate or chloride, an organic salt such as an acetate, citrate, maleate, formate, lactate or oxalate, an organic complex, or an ammine complex, of the metal element, may be mentioned. Among them, a nitrate, an organic acid salt, an organic complex or an ammine complex is particularly preferred in that the solubility in a solvent is high, and the anion tends to be readily decomposed by heat.

Specifically, the water-soluble compound (1) is preferably aluminum nitrate, aluminum acetate, aluminum oxalate, aluminum citrate, aluminum lactate, basic aluminum lactate, aluminum maleate, yttrium nitrate, yttrium formate, yttrium citrate, yttrium acetate or yttrium oxalate.

The water-soluble compound (2) is preferably a compound having the above anion combined with a cation which will be decomposed and evaporated by heating, and for example, acids such as $H_2SO_4$, $H_2SO_3$, $H_2S_2O_3$, $H_2SO_6$, $H_2SO_8$, $H_3BO_3$, $HBO_2$, $H_2B_4O_7$, $HB_5O_8$, etc., or their ammonium salts or amine salts may be mentioned. Among them, boric acid or the above ammonium salts are particularly preferred, whereby the pH will not be low.

Specifically, the water-soluble compound (2) is preferably boric acid, ammonium sulfate (($NH_4$)$_2SO_4$), aluminum sulfate, yttrium sulfate, ammonium hydrogensulfate (($NH_4$)$HSO_4$), ammonium borate (($NH_4$)$_3BO_3$) or ammonium hydrogenborate (($NH_4$)$_2HBO_3$) or ($NH_4$)$H_2BO_3$)), more preferably ammonium sulfate (($NH_4$)$_2SO_4$) or aluminum sulfate.

In the present invention, in the entire aqueous solution having the first and second aqueous solutions put together, in order to bring the absolute value of the total of values obtained by multiplying the number of moles by the valency of said anion (n) containing S and B in said second aqueous solution, to be small as compared with the total of values obtained by multiplying the number of moles by the valency of said cation (p) having the metal element in said first aqueous solution, it is preferred to use the water-soluble compound (1) having the metal element and having an anion which will be decomposed and evaporated by heating, and the water-soluble compound (2) having the non-metal element and having a cation which will be decomposed and evaporated by heating, in combination.

Further, in the present invention, it is preferred to adjust the amount (molar amount) of the metal element contained in the covering layer to be in a ratio of from 0.001 to 0.03 to the molar amount of the lithium-containing composite oxide as the base material. And, in order to control the amount of the metal element in the covering layer within this range, it is preferred to adjust the amount (molar ratio) of the cation (p) having the metal element contained in the first aqueous solution to be in a ratio of from 0.001 to 0.03 to the amount (molar amount) of the lithium-containing composite oxide. The value of the molar ratio of the cation (p) to the lithium-containing composite oxide is more preferably from 0.005 to 0.02, particularly preferably from 0.01 to 0.015.

Further, in order to control the amount of the non-metal element contained in the covering layer, it is preferred to adjust the amount (molar amount) of the anion (n) contained in the second aqueous solution to be in a ratio of from 0.001 to 0.03 to the amount (molar amount) of the lithium-containing composite oxide. The value of the molar ratio of the anion (n) to the lithium-containing composite oxide is more preferably from 0.005 to 0.02, particularly preferably from 0.01 to 0.015.

The amount (molar amount) of the cation (p) contained in the first aqueous solution can be measured by conducting e.g. the above-mentioned ICP. Further, the amount (molar amount) of the anion (n) contained in the second aqueous solution can be measured by e.g. the above-mentioned ICP or ion chromatography.

Further, in the process of the present invention, in the entire aqueous solution having the first and second aqueous solutions put together, {|(number of moles of said anion contained in said second aqueous solution×valency of said anion)|/((number of moles of said cation contained in said first aqueous solution×valency of said cation)+(number of moles of said cation contained in said second aqueous solution×valency of said cation)): hereinafter referred to as (Z)} is less than 1. Here, "| |" represents an absolute value. That is, although the valency of an anion becomes a negative value, the value of (Z) is made to be a positive number by taking the absolute value of (number of moles of the anion x valency of the anion). The value of (Z) is within a range of preferably from 0.1 to 0.8, more preferably from 0.2 to 0.6, particularly preferably from 0.3 to 0.5.

By adjusting the amounts of the cation (p) and the anion (n) contained in the first aqueous solution and in the second aqueous solution to bring the value of (Z) to be less than 1, it is possible to adjust the atomic ratio of elements (the non-metal element/the metal element) contained within 5 nm of the surface layer of the particles (III) to be within the desired range.

For example, in a case where 1 mol % (0.01 mol) of $Al^{3+}$ per 1 mol of the lithium ion composite oxide is incorporated in the covering layer, (number of moles of $Al^{3+}$×valency of $Al^{3+}$) becomes to be:

0.01 mol×(+3)=0.03.

Further, for example, in a case where 0.5 mol % (0.005 mol) of $SO_4^{2-}$ per mol of the lithium ion composite oxide is incorporated in the covering layer, the value of (number of moles of $SO_4^{2-}$×valency of $SO_4^{2-}$) becomes to be:

|0.005 mol×(−2)|=0.01.

In the case of a combination of $Al^{3+}$ and $SO_4^{2-}$, (number of moles of $Al^{3+}$×valency of $Al^{3+}$) as the cation which will remain without being decomposed or evaporated by heating is 0.03, and 0.01 being the absolute value of (number of moles of $SO_4^{2-}$×valency of $SO_4^{2-}$) as the anion which will remain without being decomposed or evaporated by heating is smaller. And, the value of (Z) becomes to be 0.01/0.03=0.33.

In the present invention, as the solvent for the first and second aqueous solutions, water such as distilled water may be used, and to such an extent not to impair the solubility of the water-soluble compound, a water-soluble alcohol or polyol may be added as a solvent. The water-soluble alcohol may, for example, be methanol, ethanol, 1-propanol or 2-propanol. The polyol may, for example, be ethylene glycol, propylene glycol, diethylene glycol, dipropylene glycol, polyethylene glycol, butanediol or glycerine.

The total content of the water-soluble alcohol and polyol is preferably from 0 to 20 mass %, more preferably from 0 to 10 mass %, to the entire amount of the solvent. The solvent is preferably composed solely of water, as being excellent from the viewpoint of safety, environmental aspect, handling efficiency and costs.

Further, at least one of the first aqueous solution and the second aqueous solution may contain a pH adjusting agent to adjust the solubility of the water-soluble compound. As such a pH adjusting agent, one which will be volatilized or decomposed when heated, is preferred. Specifically, an organic acid such as acetic acid, citric acid, lactic acid, formic acid, maleic acid or oxalic acid, or ammonia is preferred. When such a volatile or decomposable pH adjusting agent is used, impurities are less likely to remain, and good battery characteristics tend to be readily obtainable.

The pH of the first aqueous solution and the second aqueous solution is preferably from 2 to 12, more preferably from 3 to 11, particularly preferably from 4 to 10. When the pH is within such a range, at the time of contacting the lithium-containing composite oxide with such an aqueous solution, elution of lithium or a transition metal from the lithium-containing composite oxide will be less, and impurities due to addition of a pH adjusting agent or the like can be reduced, whereby good battery characteristics tend to be readily obtainable.

In the first contact step and the second contact step in the present invention, the method for contacting the lithium-containing composite oxide and the aqueous solution may, for example, be a method of adding a prescribed aqueous solution to a powder of the lithium-containing composite oxide, followed by stirring and mixing, or a method of applying a prescribed aqueous solution to a powder of the lithium-containing composite oxide by spray coating. The method of applying the aqueous solution by spray coating is more preferred, since a filtration or washing step as a post-treatment step is not required, the productivity is excellent, and it is possible to form a covering layer uniformly on the surface of the lithium-containing composite oxide particles.

Here, a "prescribed aqueous solution" is meant for the first aqueous solution in the first contact step, and for the second aqueous solution in the second contact step. The same applies in the following description.

In the method for stirring and mixing, it is preferred that while stirring the powder of the lithium-containing composite oxide, the aqueous solution is added thereto, and the water-soluble compound contained in the aqueous solution is contacted to the surface of the powder of the lithium-containing composite oxide. As the stirring apparatus, it is possible to use a stirring machine having a low shearing force, such as a drum mixer or a solid air mixer. By contacting the prescribed aqueous solution and a powder of the lithium-containing composite oxide while stirring and mixing, it is possible to obtain particles having a covering layer formed more uniformly on the surface of the lithium-containing composite oxide particles.

In the contact step in the present invention, an aqueous solution containing both of the cation (p) and the anion (n) may be contacted to the powder of the lithium-containing composite oxide. Otherwise, the cation (p) and the anion (n) may be formed into separate aqueous solutions and may be separately contacted to the powder of the lithium-containing composite oxide.

That is, the first contact step and the second contact step may be the same step, or separate steps. From the viewpoint of the productivity, the first contact step and the second contact step are preferably the same step.

In a case where the first aqueous solution and the second aqueous solution are separately contacted to the lithium-containing composite oxide, the order of contact may be such that after contacting the cation (p), the anion (b) may be contacted, or after contacting the anion (n), the cation (p) may be contacted. Otherwise, the cation (p) and the anion (n) may be contacted alternately a plurality of times, or may be contacted simultaneously. As the reaction of the cation (p) with the anion (n) is considered to readily proceed, it is particularly preferred that the order is such that contact to the anion (n) is followed by contact to the cation (p), i.e. after contacting the anion (n) to a power of the lithium-containing composite oxide, the cation (p) is contacted.

The concentration of the prescribed water-soluble compound in the first aqueous solution or in the second aqueous solution is preferably high, since it is required to remove a solvent by heating as a post treatment step. However, if the concentration is too high, the viscosity tends to be high, and the uniform mixing property of the lithium-containing composite oxide and the aqueous solution tends to deteriorate. Therefore, the concentration of the prescribed water-soluble compound contained in the aqueous solution is preferably from 0.5 to 30 mass %, more preferably from 2 to 20 mass %, as calculated based on element concentrations.

Here, the "prescribed water-soluble compound" is meant for the first water-soluble compound in the first aqueous solution, and for the second water-soluble compound in the second aqueous solution.

In the first contact step and the second contact step of the present invention, the powder of the lithium-containing composite oxide is contacted with the prescribed aqueous solution, followed by drying. In a case where spray coating is employed as the contacting method, the spray coating and the drying may be conducted alternately, or while conducting spray coating, the drying may be simultaneously carried out. The drying temperature is preferably from 40 to 200° C., more preferably from 60 to 150° C.

In a case where the lithium-containing composite oxide becomes agglomerates by the contact with the aqueous solution, followed by the drying, it is preferred to pulverize the agglomerates. The spraying amount of the aqueous solution in the spray coating is preferably from 0.005 to 0.1 g/min. to 1 g of the lithium-containing composite oxide.

<Heating Step>

In the process of the present invention, after conducting the above-described first contact step and second contact step, heating is carried out. By the heating, it is possible to obtain the desired cathode active material and at the same time to remove volatile impurities such as water, organic components, etc.

The heating is preferably carried out in an oxygen-containing atmosphere. Further, the heating temperature is preferably from 250 to 700° C., more preferably from 350 to 600° C. When the heating temperature is at least 250° C., it is possible to readily form a covering layer comprising a metal oxide (I) containing at least one metal element selected from the group consisting of Al, Y, Ga, In, La, Pr, Nd, Gd, Dy, Er and Yb, and the compound (II) containing Li and at least one non-metal element selected from the group consisting of S and B. Further, volatile impurities such as residual moisture will be less, whereby it is possible to suppress deterioration of the cycle characteristics. Further, when the heating temperature is at most 700° C., it is possible prevent diffusion of the metal element to the inside of the lithium-containing composite oxide and thus to prevent the covering layer from failing to function properly.

In order to form the covering layer to be amorphous on the surface of the lithium-containing composite oxide particles, the heating temperature is preferably from 250 to 550° C., more preferably from 350 to 500° C. When the heating temperature is at most 550° C., the covering layer tends to be hardly crystallized.

The heating time is preferably from 0.1 to 24 hours, more preferably from 0.5 to 18 hours, particularly preferably from 1 to 12 hours. By adjusting the heating time within such a range, it is possible to efficiently form the covering layer on the surface of the lithium-containing composite oxide particles.

The pressure at the time of the heating is not particularly limited, and ordinary pressure or elevated pressure is preferred, and ordinary pressure is particularly preferred.

The cathode active material obtainable by the process of the present invention is particles (III) having a covering layer comprising a metal oxide (I) containing at least one metal element selected from the group consisting of Al, Y, Ga, In, La, Pr, Nd, Gd, Dy, Er and Yb, and a compound (II) containing Li and at least one non-metal element selected from the group consisting of S and B, on the surface of particles of the lithium-containing composite oxide. And, the covering layer is one to be formed by the first aqueous solution and the second aqueous solution which are used in the process of the present invention.

The details of the covering layer are as described in the above section for cathode active material for lithium ion secondary battery of the present invention.

It is considered that in the cathode active material obtainable by the process of the present invention, contact of the lithium-containing composite oxide and the electrolytic solution is reduced by the covering layer, whereby elution of a transition metal such as Mn into the electrolyte solution from the surface of the lithium-containing composite oxide is suppressed, and the cycle characteristics are thereby improved. Further, it is considered that it is possible to suppress deposition of decomposition products of the electrolytic solution, on the surface of the lithium-containing composite oxide, whereby the rate characteristics are improved.

That is, as a result of coexistence of the compound (II) containing Li and the non-metal element and the metal oxide (I) having the metal element in the covering layer, for example when $LiPF_6$ is used as an electrolyte, HF which will be formed by decomposition of $LiPF_6$ will be reacted with the metal oxide (I) and thus, HF will be consumed, whereby the cycle characteristics will be improved.

Further, by adjusting the value of the above (Z) to be less than 1, the discharge capacity, rate characteristics and cycle characteristics are improved. The reason for the improvement is not clearly understood, but is considered to be such that by the presence of the compound (II) having an ion binding property in a proper amount, the mobility of lithium ions is improved, whereby the battery characteristics are improved.

[Cathode for Lithium Ion Secondary Cell]

The cathode for a lithium ion secondary battery of the present invention has a cathode active material layer comprising the cathode active material for a lithium ion secondary battery of the present invention, an electrically conductive material and a binder, formed on a cathode current collector (cathode surface).

A method for producing such a cathode for a lithium ion secondary battery may, for example, be a method wherein the above cathode active material, an electrically conductive material and a binder are supported on a cathode current collector plate. At that time, the cathode can be produced, for example, in such a manner that the electrically conductive material and the binder may be dispersed in a solvent and/or dispersing medium to prepare a slurry, or kneaded with a solvent and/or dispersing medium, to prepare a kneaded product, and the prepared slurry or kneaded product is supported on a cathode current collector plate by e.g. coating.

The electrically conductive material may, for example, be a carbon black such as acetylene black, graphite or Ketjenblack.

The binder may, for example, be a fluoro resin such as polyvinylidene fluoride or polytetrafluoroethylene, a polyolefin such as polyethylene or polypropylene, an unsaturated bond-containing polymer or copolymer such as styrene/butadiene rubber, isoprene rubber or butadiene rubber, or an acrylic acid type polymer or copolymer such as acrylic acid copolymer or methacrylic acid copolymer.

The cathode current collector may, for example, be an aluminum foil or an aluminum alloy foil.

[Lithium Ion Secondary Battery]

The lithium ion secondary battery of the present invention comprises the above-described cathode for a lithium ion secondary battery of the present invention, an anode and a non-aqueous electrolyte.

The anode comprises an anode current collector and an anode active material layer containing an anode active material, formed thereon. The anode can be produced, for example, in such a manner that an anode active material is kneaded with an organic solvent to prepare a slurry, and the prepared slurry is applied to an anode current collector, followed by drying and pressing.

As the anode current collector, a metal foil such as a nickel foil or cupper foil may, for example, be used.

The anode active material may be any material so long as it is capable of absorbing and desorbing lithium ions at a relatively low potential. For example, it is possible to employ a lithium metal, a lithium alloy, a carbon material, an oxide composed mainly of a metal in Group 14 or 15 of the periodic table, a carbon compound, a silicon carbide compound, a silicon oxide compound, titanium sulfide, a boron carbide compound, etc.

As the carbon material as the anode active material, it is possible to use, for example, non-graphitizable carbon, artificial graphite, natural graphite, thermally decomposed carbon, cokes such as pitch coke, needle coke, petroleum coke, etc., graphites, glassy carbons, an organic polymer compound fired product obtained by firing and carbonizing a phenol resin, furan resin, etc. at a suitable temperature, carbon fibers, activated carbon, carbon blacks, etc.

The metal in Group 14 of the periodic table may, for example, be silicon or tin, and most preferred is silicon.

Further, as a material which can be used as the anode active material, it is possible to use, for example, an oxide such as iron oxide, ruthenium oxide, molybdenum oxide, tungsten oxide, titanium oxide, tin oxide, etc. or a nitride such as $Li_{2.6}Co_{0.4}N$.

As the non-aqueous electrolyte solution, it is possible to use one prepared by suitably combining an organic solvent and an electrolyte. As the organic solvent, it is possible to use a conventional one known as an organic solvent for an electrolytic solution, and for example, it is possible to use propylene carbonate, ethylene carbonate, diethyl carbonate, dimethyl carbonate, 1,2-dimethoxyethane, 1,2-diethoxyethane, diglyme, triglyme, γ-butyrolacton, diethyl ether, sulfolan, methyl sulfolan, acetonitrile, an acetic acid ester, a butyric acid ester, a propionic acid ester, etc. Particularly, from the viewpoint of the voltage stability, it is preferred to use a cyclic carbonate such as propylene carbonate, or a chain-structured carbonate such as dimethyl carbonate or diethyl carbonate. Further, such organic solvents may be used alone, or two or more of them may be used as mixed.

Further, as other non-aqueous electrolytes, it is possible to use a solid electrolyte containing an electrolyte salt, a polymer electrolyte, a solid or geled electrolyte having an electrolyte mixed or dissolved in e.g. a polymer compound, etc.

The solid electrolyte may be any material so long as it has lithium ion conductivity, and for example, either one of an inorganic solid electrolyte and a polymer electrolyte may be used.

As the inorganic solid electrolyte, it is possible to use lithium nitride, lithium iodide, etc.

As the polymer electrolyte, it is possible to use an electrolyte salt and a polymer compound which dissolves the electrolyte salt. And, as such a polymer compound, it is possible to use polyethylene oxide, polypropylene oxide, polyphosphazene, polyaziridine, polyethylene sulfide, polyvinyl alcohol, polyvinylidene fluoride and polyhexafluoropropylene, or their derivatives, mixtures and complexes.

The geled electrolyte may be any one so long as it is geled upon absorption of the above non-aqueous electrolyte, and various polymers may be employed. Further, as the polymer material to be used for the geled electrolyte, it is possible to use, for example, a fluorinated polymer such as poly(vinylidene fluoride) or poly(vinylidene fluoride-co-hexafluoropropylene). Further, as a polymer material to be used for the geled electrolyte, it is possible to use, for example, polyacrylonitrile or a copolymer of polyacrylonitrile, as well as an ether type polymer, such as a polyethylene oxide, or a copolymer or cross-linked product of polyethylene oxide. The copolymerizable monomer may, for example, be polypropylene oxide, methyl methacrylate, butyl methacrylate, methyl acrylate or butyl acrylate.

As the matrix of the geled electrolyte, a fluorinated polymer is particularly preferred from the viewpoint of the stability against the redox reaction.

As the electrolyte salt, any one of those commonly used for batteries of this type may be used. For example, $LiClO_4$, $LiPF_6$, $LiBF_4$, $CF_3SO_3$ Li, LiCl, LiBr, etc. may be used.

The shape of the lithium ion secondary battery of the present invention may be suitably selected depending on the intended use from e.g. a coin-shape, a sheet-form (film-form), a folded shape, a wound cylinder with bottom, a button shape, etc.

According to the process for producing a cathode active material for a lithium ion secondary battery of the present invention, it is possible to produce with good productivity, a cathode active material for a lithium ion secondary battery excellent in the cycle characteristics and rate characteristics even when charging is conducted at a high voltage. Further, according to the process of the present invention, a filtration or washing step as a post-treatment step is not required, the lithium-containing composite oxide will not be agglomerated, the handling such as stirring is easy, and no agglomeration is likely to occur during the drying, whereby the productivity will be remarkably improved.

Further, according to the cathode for a lithium ion secondary battery of the present invention employing the cathode active material obtainable by the process of the present invention, and the lithium ion secondary battery employing the cathode, it is possible to realize excellent cycle characteristics and rate characteristics, even when charging is conducted at a high voltage.

EXAMPLES

Now, the present invention will be described in detail with reference to Examples, but it should be understood that the present invention is by no means restricted by the Examples.

Synthesis Example for Lithium-Containing Composite Oxide (A)

By adding 1,245.9 g of distilled water to a mixture of 140.6 g of nickel(II) sulfate hexahydrate, 131.4 g cobalt(II) sulfate heptahydrate and 482.2 g of manganese(II) sulfate pentahydrate, a raw material solution was obtained wherein the above compounds were uniformly dissolved. Further, by adding 320.8 g of distilled water, 79.2 g of ammonium sulfate was uniformly dissolved to obtain an ammonia solution. By adding 1,920.8 g of distilled water, 79.2 g of ammonium sulfate was uniformly dissolved to obtain a mother liquid. By adding 600 g of distilled water, 400 g of sodium hydroxide was uniformly dissolved to obtain a pH-adjusting liquid.

Into a 2 L baffle-equipped glass reactor, the mother liquid was put and heated to 50° C. by a mantle heater, and the pH-adjusting liquid was added to bring the pH to be 11.0. While stirring the solution in the reactor by anchor-type stirring vanes, the raw material solution was added at a rate of 5.0 g/min, and the ammonia source solution was added at a rate of 1.0 g/min, to have a composite hydroxide of nickel, cobalt and manganese precipitated. During the addition of the raw material solution, the pH-adjusting solution was added to maintain the pH in the reactor to be 11.0. Further, in order to prevent oxidation of the precipitated hydroxide, nitrogen gas was introduced into the reactor at a flow rate of 0.5 L/min.

In order to remove impurity ions from the obtained composite hydroxide of nickel, cobalt and manganese, pressure filtration and dispersion to distilled water were repeated for washing. The washing was terminated when the electrical conductivity of the filtrate became less than 25 µS/cm, followed by drying at 120° C. for 15 hours to obtain a precursor.

The contents of nickel, cobalt and manganese in the precursor were measured by ICP and found to be 11.6 mass %, 10.5 mass % and 42.3 mass %, respectively. The molar ratio of nickel:cobalt:manganese was found to be 0.172: 0.156:0.672.

Then, 20 g of this precursor and 12.6 g of lithium carbonate having a lithium content of 26.9 mol/kg were mixed and fired at 900° C. for 12 hours in an oxygen-containing atmosphere to obtain a powder of a lithium-containing composite oxide. This powder will be referred to as lithium-containing composite oxide (A).

The composition of the obtained lithium-containing composite oxide (A) was Li $(Li_{0.2}Ni_{0.137}Co_{0.125}Mn_{0.538})O_2$. The lithium-containing composite oxide (A) had an average particle size D50 of 5.9 µm, and a specific surface area of 2.6 m$^2$/g as measured by means of a BET method.

Synthesis Example for Lithium-Containing Composite Oxide (B)

By adding 1,245 g of distilled water to a mixture of 197 g of nickel(II) sulfate hexahydrate, 105 g cobalt(II) sulfate heptahydrate and 452 g of manganese(II) sulfate pentahydrate, a raw material solution was obtained wherein the above compounds were uniformly dissolved. Further, by adding 401 g of distilled water, 99 g of ammonium sulfate was uniformly dissolved to obtain an ammonia solution. By adding 1,900 g of distilled water, 1 g of sodium carbonate was uniformly dissolved to obtain a mother liquid. Further, by adding 1,850 g of distilled water, 350 g of sodium carbonate was uniformly dissolved to obtain an aqueous carbonate solution.

Then, into a 2 L baffle-equipped glass reactor, the mother liquid was put and heated to 50° C. by a mantle heater. While stirring the solution in the reactor by double stage inclined paddle type stirring blades, the raw material solution was added at a rate of 5.0 g/min, and the ammonia solution was added at a rate of 0.5 g/min, over a period of 6 hours, to have a composite carbonate of nickel, cobalt and manganese precipitated. Here, during the addition of the raw material solution, the aqueous carbonate solution was added to maintain the pH in the reactor to be 8.0. Further, in order to prevent oxidation of the precipitated transition metal carbonate, nitrogen gas was introduced into the reactor at a flow rate of 0.5 L/min.

In order to remove impurity ions from the obtained composite carbonate of nickel, cobalt and manganese, pressure filtration and dispersion to distilled water were repeated for washing. The washing was terminated when the electrical conductivity of the filtrate became less than 100 µS/cm, followed by drying at 120° C. for 15 hours to obtain a precursor.

The contents of nickel, cobalt and manganese in the precursor were measured by ICP, whereby the molar ratio of nickel:cobalt:manganese was found to be 0.245:0.126: 0.629. Further, the content of a transition metal contained in the precursor was determined by back titration using ZIN-CON indicator and EDTA and found to be 8.23 mol/kg.

Then, 20 g of this precursor and 8.2 g of lithium carbonate having a lithium content of 26.9 mol/kg were mixed and fired at 850° C. for 16 hours in an oxygen-containing atmosphere to obtain a powder of a lithium-containing composite oxide. This powder will be referred to as lithium-containing composite oxide (B).

The composition of the obtained lithium-containing composite oxide (B) was Li $(Li_{0.143}Ni_{0.210}Co_{0.108}Mn_{0.539})O_2$. The lithium-containing composite oxide (B) had an average particle size D50 of 11.2 µm, and a specific surface area of 6.8 m$^2$/g as measured by means of a BET method.

Synthesis Example for Lithium-Containing Composite Oxide (C)

A precursor was obtained in the same manner as in Synthesis Example for lithium-containing composite oxide (B), except that a raw material solution obtained by adding 1,253 g of distilled water to a mixture of 260 g of nickel(II) sulfate hexahydrate, 17 g cobalt(II) sulfate heptahydrate and 470 g of manganese(II) sulfate pentahydrate, and having the above compounds uniformly dissolved therein, was used as the raw material solution.

The contents of nickel, cobalt and manganese in the precursor were measured by ICP, whereby the molar ratio of nickel:cobalt:manganese was found to be 0.326:0.020:

0.654. Further, the content of a transition metal contained in the precursor was determined by back titration using ZINCON indicator and EDTA and found to be 8.53 mol/kg.

Then, 20 g of this precursor and 8.25 g of lithium carbonate having a lithium content of 26.9 mol/kg were mixed and fired at 850° C. for 16 hours in an oxygen-containing atmosphere to obtain a powder of a lithium-containing composite oxide. This powder will be referred to as lithium-containing composite oxide (C).

The composition of the obtained lithium-containing composite oxide (C) was Li $(Li_{0.130}Ni_{0.283}Co_{0.017}Mn_{0.569})O_2$. The lithium-containing composite oxide (C) had an average particle size D50 of 11.2 μm, and a specific surface area of 9.2 m$^2$/g as measured by means of a BET method.

Example 1

To 7.0 g of a raw material aluminum lactate aqueous solution having an aluminum (Al) content of 4.5 mass % and a pH of 4.6, 3.0 g of distilled water was added and mixed to prepare an aqueous aluminum lactate solution. Further, to 0.77 g of ammonium sulfate $((NH_4)_2SO_4)$, 9.23 g of distilled water was added and mixed to prepare an aqueous ammonium sulfate solution.

Then, while stirring the lithium-containing composite oxide (A), to 10 g thereof, 1 g of the aqueous ammonium sulfate solution was applied by spray coating. Further, to 10 g of the lithium-containing composite oxide (A) being stirred, 1 g of the aqueous aluminum lactate solution was applied by spray coating, to obtain a mixture. Here, the value of (Z) of the cation ($Al^{3+}$) and the anion ($SO_4^{2-}$) spray-coated on the lithium-containing composite oxide (A) was 0.33.

Then, the obtained mixture was dried at 90° C. for 2 hours and then heated at 400° C. for 8 hours in an oxygen-containing atmosphere to obtain a cathode active material (1) made of particles (III) having a covering layer containing Al and S on the surface of the lithium-containing composite oxide (A). The specific surface area of the cathode active material (1) is shown in Table 6.

Then, with respect to the obtained cathode active material (1), an XRD measurement was carried out under the after-described conditions. From the measured XRD spectrum (as shown in FIG. 1), the cathode active material (1) was confirmed to have a layered rock salt type crystal structure (space group R-3m). Further, a peak of layered $Li_2MnO_3$ was observed within a range of 2θ=20 to 25° and further, a peak attributable to $Li_2SO_4$ and $Li_2SO_4.H_2O$ as the compound (II) containing a non-metal element (S) was observed. On the other hand, in the XRD spectrum, no peak attributable to the metal oxide (I) containing Al was observed. Compounds having peaks detected by XRD, are shown in Table 1.

Figure 2:
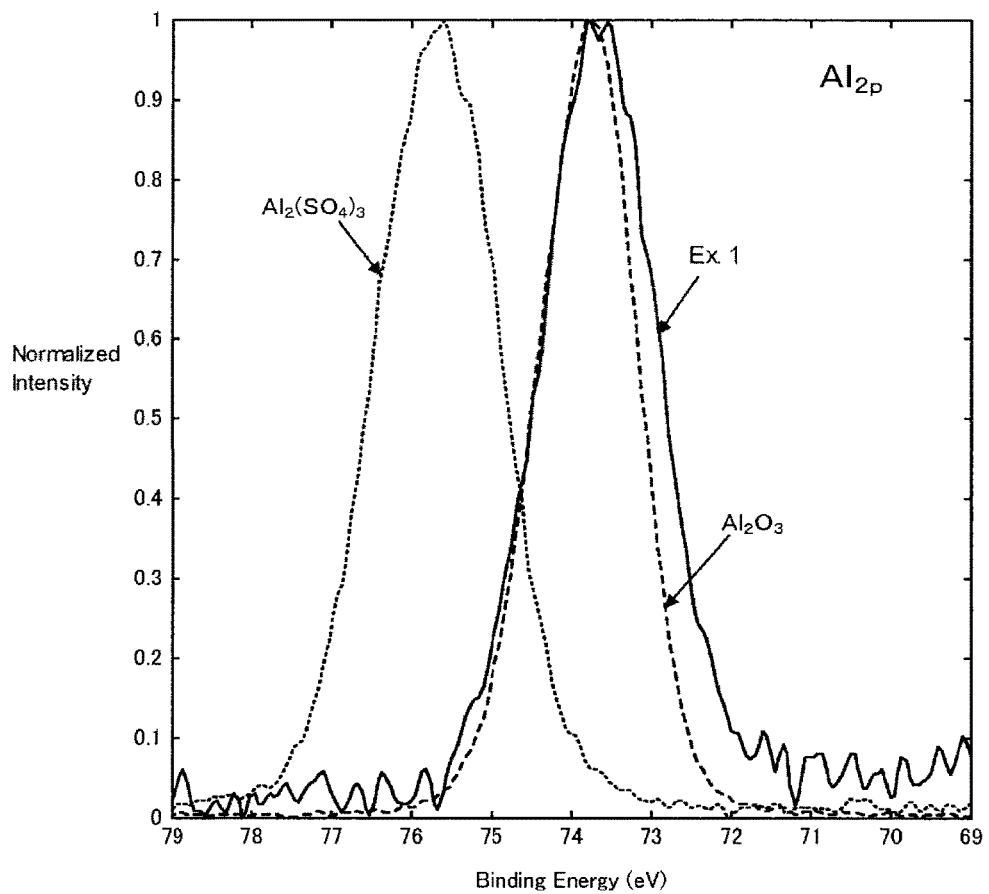
FIG. 2 is a graph showing the results ($Al_{2p}$) of measurement by an XPS (X-ray photoelectron spectroscopic) analysis with respect to the cathode active material (1) obtained in Example 1.
Figure 3:
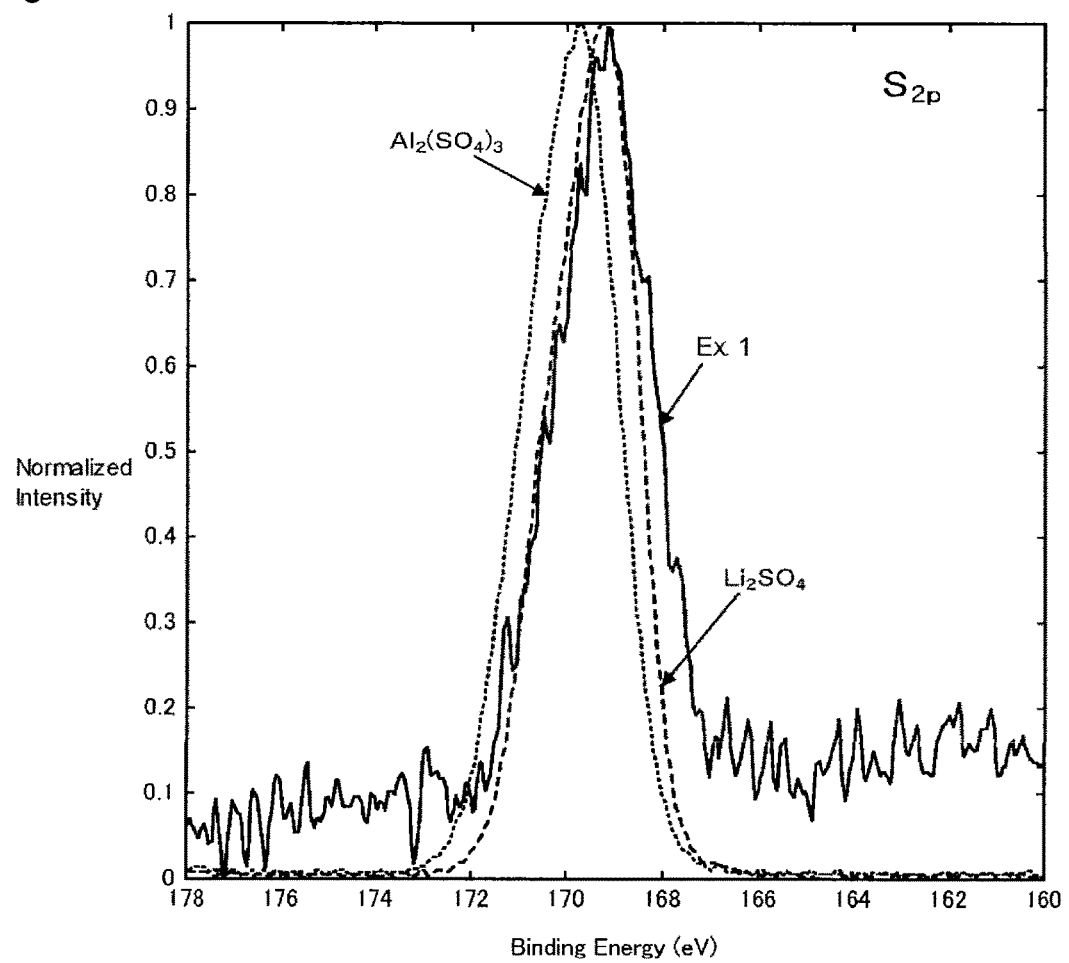
FIG. 3 is a graph showing the results ($S_{2p}$) of measurement by an XPS (X-ray photoelectron spectroscopic) analysis with respect to the cathode active material (1) obtained in Example 1.

Then, with respect to the obtained cathode active material (1), an XPS measurement was carried out under the after-described conditions. Using $Al_2O_3$, $Al_2(SO_4)_3$ and $Li_2SO_4$ as comparative samples, chemical shifts of $Al_{2p}$ and $S_{2p}$ of the cathode active material (1) were compared. As a result, as shown in FIGS. 2 and 3, the chemical shifts of $Al_{2p}$ and $S_{2p}$ of the cathode active material (1) were found to agree to the chemical shifts of $Al_2O_3$ and $Li_2SO_4$, respectively. Further, from the results of this measurement, the atomic ratio $(S_{2p}/Al_{2p})$ of the non-metal element (S) to the metal element (Al) was calculated. These results of the XPS measurement are shown in Table 2.

From the results of the XRD and XPS measurements, it was confirmed that the compound containing the metal element (Al) contained in the covering layer was $Al_2O_3$, and the compound (II) containing the non-metal element (S) was $Li_2SO_4$ and $Li_2SO_4.H_2O$. Further, $Al_2O_3$ was not detected by XRD and therefore is considered to be amorphous.

Example 2

An aqueous ammonium sulfate solution was prepared by adding 8.77 g of distilled water to 1.23 g of ammonium sulfate $((NH_4)_2SO_4)$. And, in the same manner as in Example 1 except that this aqueous ammonium sulfate solution was applied by spray coating to the lithium-containing composite oxide (A), a cathode active material (2) was obtained, which was made of particles (Ill) having a covering layer containing Al and S on the surface of the lithium-containing composite oxide particles. The specific surface area of the cathode active material (2) is shown in Table 6.

Here, the value of (Z) of the cation ($Al^{3+}$) and the anion ($SO_4^{2-}$) spray-coated on the lithium-containing composite oxide (A) was 0.53.

Then, with respect to the obtained cathode active material (2), an XRD measurement and an XPS measurement were carried out in the same manner as in Example 1. Compounds having peaks detected by XRD are shown in Table 1, and the atomic ratio $(S_{2p}/Al_{2p})$ of the non-metal element (S) to the metal element (Al) and the results of the XPS measurement are shown in Table 2.

From the results of the XRD and XPS measurements, it was confirmed that the compound containing the metal element (Al) contained in the covering layer was $Al_2O_3$, and the compound (II) containing the non-metal element (S) was $Li_2SO_4$ and $Li_2SO_4.H_2O$. Further, $Al_2O_3$ was not detected by XRD and therefore is considered to be amorphous.

Example 3

An aqueous ammonium sulfate solution was prepared by adding 8.46 g of distilled water to 1.54 g of ammonium sulfate $((NH_4)_2SO_4)$. And, in the same manner as in Example 1 except that this aqueous ammonium sulfate solution was applied by spray coating to the lithium-containing composite oxide (A), a cathode active material (3) was obtained, which was made of particles (Ill) having a covering layer containing Al and S on the surface of the lithium-containing composite oxide particles. The specific surface area of the cathode active material (3) is shown in Table 6.

Here, the value of (Z) of the cation ($Al^{3+}$) and the anion ($SO_4^{2-}$) spray-coated on the lithium-containing composite oxide (A) was 0.67.

Then, with respect to the obtained cathode active material (3), an XRD measurement and an XPS measurement were carried out in the same manner as in Example 1. The measured XRD spectrum is shown in FIG. 1, compounds having peaks detected by XRD are shown in Table 1, and the atomic ratio $(S_{2p}/Al_{2p})$ of the non-metal element (S) to the metal element (Al) and the results of the XPS measurement are shown in Table 2.

From the results of the XRD and XPS measurements, it was confirmed that the compound containing the metal element (Al) contained in the covering layer was $Al_2O_3$, and the compound (II) containing the non-metal element (S) was $Li_2SO_4$ and $Li_2SO_4.H_2O$. Further, $Al_2O_3$ was not detected by XRD and therefore is considered to be amorphous.

Example 4

To 7.0 g of a raw material aluminum lactate aqueous solution having an aluminum (Al) content of 4.5 mass % and a pH of 4.6, 3.0 g of distilled water was added and mixed to prepare an aqueous aluminum lactate solution. Further, to 1.54 g of ammonium sulfate ($(NH_4)_2SO_4$), 8.46 g of distilled water was added and mixed to prepare an aqueous ammonium sulfate solution.

Then, while stirring the lithium-containing composite oxide (A), to 10 g thereof, 1 g of the aqueous ammonium sulfate solution was applied by spray coating. Then, to 10 g of the lithium-containing composite oxide (A) being stirred in the same manner, 2 g of the aqueous aluminum lactate solution was applied by spray coating. Here, the value of (Z) of the cation ($Al^{3+}$) and the anion ($SO_4^{2-}$) spray-coated on the lithium-containing composite oxide (A) was 0.33.

Thereafter, heating was conducted in the same manner as in Example 1 to obtain a cathode active material (4) made of particles (III) having a covering layer containing Al and S on the surface of the lithium-containing composite oxide particles. The specific surface area of the cathode active material (4) is shown in Table 6.

Then, with respect to the obtained cathode active material (4), an XRD measurement and an XPS measurement were carried out in the same manner as in Example 1. Compounds having peaks detected by XRD are shown in Table 1, and the atomic ratio ($S_{2p}/Al_{2p}$) of the non-metal element (S) to the metal element (Al) and the results of the XPS measurement are shown in Table 2.

From the results of the XRD and XPS measurements, it was confirmed that the compound containing the metal element (Al) contained in the covering layer was $Al_2O_3$, and the compound (II) containing the non-metal element (S) was $Li_2SO_4$ and $Li_2SO_4 \cdot H_2O$. Further, $Al_2O_3$ was not detected by XRD and therefore is considered to be amorphous.

Example 5

To 4.47 g of yttrium nitrate hexahydrate, 5.53 g of distilled water was added and mixed to prepare an aqueous yttrium nitrate solution. Further, to 0.77 g of ammonium sulfate ($(NH_4)_2SO_4$), 9.23 g of distilled water was added and mixed to prepare an aqueous ammonium sulfate solution.

Then, while stirring the lithium-containing composite oxide (A), to 10 g thereof, 1 g of the aqueous ammonium sulfate solution was applied by spray coating. Then, 1 g of the aqueous yttrium nitrate solution was applied by spray coating. Here, the value of (Z) of the cation ($Y^{3+}$) and the anion ($SO_4^{2-}$) spray-coated on the lithium-containing composite oxide (A) was 0.33.

Thereafter, heating was conducted in the same manner as in Example 1 to obtain a cathode active material (5) made of particles (III) having a covering layer containing Y and S on the surface of the lithium-containing composite oxide particles. The specific surface area of the cathode active material (5) is shown in Table 6.

Then, with respect to the obtained cathode active material (5), an XRD measurement and an XPS measurement were carried out in the same manner as in Example 1. Compounds having peaks detected by XRD are shown in Table 1, and the results of the XPS measurement are shown in Table 2.

From the results of the XRD and XPS measurements, it was confirmed that the compound (II) containing the non-metal element (S) contained in the covering layer was $Li_2SO_4$ and $Li_2SO_4 \cdot H_2O$. Further, $Y_2O_3$ was not detected by XRD and therefore is considered to be amorphous.

Example 6

To 7.0 g of a raw material aluminum lactate aqueous solution having an aluminum (Al) content of 4.5 mass % and a pH of 4.6, 3.0 g of distilled water was added and mixed to prepare an aqueous aluminum lactate solution. Further, to 0.36 g of boric acid ($H_3BO_3$), 9.64 g of distilled water was added and mixed to prepare an aqueous boric acid solution.

Then, while stirring the lithium-containing composite oxide (A), to 10 g thereof, 1 g of the above aqueous boric acid solution was applied by spray coating. Then, 1 g of the aqueous aluminum lactate solution was applied by spray coating. Here, the value of (Z) of the cation ($Al^{3+}$) and the anion ($BO_3^{3-}$) spray-coated on the lithium-containing composite oxide (A) was 0.50.

Thereafter, heating was conducted in the same manner as in Example 1 to obtain a cathode active material (6) made of particles (III) having a covering layer containing Al and B on the surface of the lithium-containing composite oxide particles. The specific surface area of the cathode active material (6) is shown in Table 6.

Then, with respect to the obtained cathode active material (6), an XRD measurement and an XPS measurement were carried out in the same manner as in Example 1. The results of the XRD measurement are shown in Table 1, and the results of the XPS measurement are shown in Table 2.

From the results of the XRD and XPS measurements, it was confirmed that the compound containing the metal element (Al) contained in the covering layer was $Al_2O_3$. Further, $Al_2O_3$ was not detected by XRD and therefore is considered to be amorphous.

Comparative Example 1

The lithium-containing composite oxide (A) obtained as described above was used as a cathode active material (7) of Comparative Example 1 as it was i.e. without subjecting it to covering treatment (formation of a covering layer). The specific surface area of the cathode active material (7) is shown in Table 6.

With respect to the obtained cathode active material (7), an XRD measurement was carried out in the same manner as in Example 1. From the measured XRD spectrum (as shown in FIG. 1), the cathode active material (7) was confirmed to have a layered rock salt type crystal structure (space group R-3m). Further, a peak of layered $Li_2MnO_3$ was observed within a range of $2\theta=20$ to $25°$.

Comparative Example 2

In Example 1, without applying the aqueous ammonium sulfate solution by spray coating to the lithium-containing composite oxide, only 1 g of the aqueous aluminum lactate solution was applied by spray coating. Otherwise in the same manner as in Example 1, a cathode active material (8) made of particles (III) having a covering layer containing Al on the surface of the lithium-containing composite oxide particles, was obtained. The specific surface area of the cathode active material (8) is shown in Table 6.

Then, with respect to the obtained cathode active material (8), an XRD measurement and an XPS measurement were carried out in the same manner as in Example 1. The measured XRD spectrum is shown in FIG. 1, compounds having peaks detected by XRD are shown in Table 1, and the atomic ratio ($S_{2p}/Al_{2p}$) of the non-metal element (S) to the metal element (Al) and the results of the XPS measurement are shown in Table 2.

Here, as shown in Table 2, the calculated value of the atomic ratio ($S_{2p}/Al_{2p}$) with respect to the cathode active material (8) is 0.03, thus showing the presence of S, but this is considered to be attributable to the residue of the component used at the time of synthesizing the lithium-containing composite oxide.

From the results of the XRD and XPS measurements, it was confirmed that the compound containing the metal element (Al) contained in the covering layer was $Al_2O_3$. Further, $Al_2O_3$ was not detected by XRD and therefore is considered to be amorphous.

Comparative Example 3

An aqueous ammonium sulfate solution was prepared by adding 7.35 g of distilled water to 2.65 g of ammonium sulfate $((NH_4)_2SO_4)$. And, in the same manner as in Example 1 except that this aqueous ammonium sulfate solution was applied by spray coating to the lithium-containing composite oxide (A), a cathode active material (9) was obtained, which was made of particles (III) having a covering layer containing Al and S on the surface of the lithium-containing composite oxide particles. The specific surface area of the cathode active material (9) is shown in Table 6.

Here, the value of (Z) of the cation ($Al^{3+}$) and the anion ($SO_4^{2-}$) spray-coated on the lithium-containing composite oxide (A) was 1.15.

Then, with respect to the obtained cathode active material (9), an XRD measurement and an XPS measurement were carried out in the same manner as in Example 1. Compounds having peaks detected by XRD are shown in Table 1, and the results of the XPS measurement are shown in Table 2.

From the results of the XRD and XPS measurements, it was confirmed that the compound containing the metal element (Al) contained in the covering layer was $Al_2O_3$, and the compound (II) containing the non-metal element (S) was $Li_2SO_4$ and $Li_2SO_4 \cdot H_2O$. Further, $Al_2O_3$ was not detected by XRD and therefore is considered to be amorphous.

Example 7

To 6.29 g of a raw material aluminum lactate aqueous solution having an aluminum (Al) content of 4.5 mass % and a pH of 4.6, 0.35 g of ammonium sulfate $((NH_4)_2SO_4)$ and 3.36 g of distilled water were added and mixed to prepare an aqueous solution having ammonium sulfate and aluminum lactate mixed.

Then, while stirring the lithium-containing composite oxide (B) obtained as described above, to 10 g thereof, 2.15 g of the aqueous solution having ammonium sulfate and aluminum lactate mixed was applied by spray coating. Here, the value of (Z) of the cation ($Al^{3+}$) and the anion ($SO_4^{2-}$) spray-coated on the lithium-containing composite oxide (B) was 0.167.

Then, the obtained mixture was dried at 90° C. for 2 hours and then heated at 450° C. for 8 hours in an oxygen-containing atmosphere to obtain a cathode active material (10) made of particles (III) having a covering layer containing Al and S on the surface of the lithium-containing composite oxide particles. The specific surface area of the cathode active material (10) is shown in Table 6.

Then, with respect to the obtained cathode active material (10), an XRD measurement and an XPS measurement were carried out in the same manner as in Example 1. Compounds having peaks detected by XRD, are shown in Table 3, and the atomic ratio ($S_{2p}/Al_{2p}$) of the non-metal element (S) to the metal element (Al) and the results of the XPS measurement are shown in Table 4.

From the results of the XRD and XPS measurements, it was confirmed that the compound containing the metal element (Al) contained in the covering layer was $Al_2O_3$, and the compound (II) containing the non-metal element (S) was $Li_2SO_4$ and $Li_2SO_4 \cdot H_2O$. Further, $Al_2O_3$ was not detected by XRD and therefore is considered to be amorphous.

TABLE 1

| Ex. | Cathode active material | Metal element | Non-metal element | Detected peak of metal element compound | Detected peak of non-metal compound |
| --- | --- | --- | --- | --- | --- |
| Ex. 1 | (1) | Al | S | Nil | $Li_2SO_4 + Li_2SO_4 \cdot H_2O$ |
| Ex. 2 | (2) | Al | S | Nil | $Li_2SO_4 + Li_2SO_4 \cdot H_2O$ |
| Ex. 3 | (3) | Al | S | Nil | $Li_2SO_4 + Li_2SO_4 \cdot H_2O$ |
| Ex. 4 | (4) | Al | S | Nil | $Li_2SO_4 + Li_2SO_4 \cdot H_2O$ |
| Ex. 5 | (5) | Y | S | Nil | $Li_2SO_4 + Li_2SO_4 \cdot H_2O$ |
| Ex. 6 | (6) | Al | B | Nil | Nil |
| Comp. Ex. 1 | (7) | Nil | Nil | Nil | Nil |
| Comp. Ex. 2 | (8) | Al | Nil | Nil | Nil |
| Comp. Ex. 3 | (9) | Al | S | Nil | $Li_2SO_4 + Li_2SO_4 \cdot H_2O$ |

TABLE 2

| Ex. | Cathode active material | Metal element | Non-metal element | Chemical shift of $Al_{2p}$ | Chemical shift of $S_{2p}$ | Atomic ratio (non-metal element/metal element) |
| --- | --- | --- | --- | --- | --- | --- |
| Ex. 1 | (1) | Al | S | Agreed to $Al_2O_3$ | Agreed to $Li_2SO_4$ | 0.16 |
| Ex. 2 | (2) | Al | S | Agreed to $Al_2O_3$ | Agreed to $Li_2SO_4$ | 0.18 |
| Ex. 3 | (3) | Al | S | Agreed to $Al_2O_3$ | Agreed to $Li_2SO_4$ | 0.19 |
| Ex. 4 | (4) | Al | S | Agreed to $Al_2O_3$ | Agreed to $Li_2SO_4$ | 0.15 |
| Ex. 5 | (5) | Y | S | — | Agreed to $Li_2SO_4$ | — |
| Ex. 6 | (6) | Al | B | Agreed to $Al_2O_3$ | — | — |
| Comp. Ex. 1 | (7) | Nil | Nil | — | — | — |
| Comp. Ex. 2 | (8) | Al | Nil | Agreed to $Al_2O_3$ | — | 0.03 |
| Comp. Ex. 3 | (9) | Al | S | Agreed to $Al_2O_3$ | Agreed to $Li_2SO_4$ | 0.30 |

Then, with respect to the obtained cathode active material (10), free alkali measurement was carried out under the after-described conditions. The results of such alkali measurement are shown in Table 5.

Example 8

To 6.29 g of a raw material aluminum lactate aqueous solution having an aluminum (Al) content of 4.5 mass % and a pH of 4.6, 1.05 g of ammonium sulfate (($NH_4$)$_2SO_4$) and 2.66 g of distilled water were added and mixed to prepare an aqueous solution having ammonium sulfate and aluminum lactate mixed. And, in the same manner as in Example 7 except that this aqueous solution having ammonium sulfate and aluminum lactate mixed, was applied and contacted by spray coating to the lithium-containing composite oxide (B), a cathode active material (11) made of particles (III) having a covering layer containing Al and S on the surface of the lithium-containing composite oxide particles. The specific surface area of the cathode active material (11) is shown in Table 6.

Here, the value of (Z) of the cation ($Al^{3+}$) and the anion ($SO_4^{2-}$) spray-coated on the lithium-containing composite oxide (B) was 0.500.

Then, with respect to the obtained cathode active material (11), an XRD measurement and an XPS measurement were carried out in the same manner as in Example 1. Compounds having peaks detected by XRD, are shown in Table 3, and the atomic ratio ($S_{2p}/Al_{2p}$) of the non-metal element (S) to the metal element (Al) and the results of the XPS measurement are shown in Table 4.

From the results of the XRD and XPS measurements, it was confirmed that the compound containing the metal element (Al) contained in the covering layer was $Al_2O_3$, and the compound (II) containing the non-metal element (S) was $Li_2SO_4$ and $Li_2SO_4 \cdot H_2O$. Further, $Al_2O_3$ was not detected by XRD and therefore is considered to be amorphous.

Then, with respect to the obtained cathode active material (11), free alkali measurement was carried out under the after-described conditions. The results of such alkali measurement are shown in Table 5.

Example 9

In the same manner as in Example 7 except that the aqueous solution having ammonium sulfate and aluminum lactate mixed, was applied by spray coating to the lithium-containing composite oxide (C), a cathode active material (12) made of particles (III) having a covering layer containing Al and S on the surface of the lithium-containing composite oxide particles (C). The specific surface area of the cathode active material (12) is shown in Table 6.

Here, the value of (Z) of the cation ($Al^{3+}$) and the anion ($SO_4^{2-}$) spray-coated on the lithium-containing composite oxide (C) was 0.167.

Then, with respect to the obtained cathode active material (12), an XRD measurement and an XPS measurement were carried out in the same manner as in Example 1. Compounds having peaks detected by XRD, are shown in Table 3, and the atomic ratio ($S_{2p}/Al_{2p}$) of the non-metal element (S) to the metal element (Al) and the results of the XPS measurement are shown in Table 4.

From the results of the XRD and XPS measurements, it was confirmed that the compound containing the metal element (Al) contained in the covering layer was $Al_2O_3$, and the compound (II) containing the non-metal element (S) was $Li_2SO_4$ and $Li_2SO_4 \cdot H_2O$. Further, $Al_2O_3$ was not detected by XRD and therefore is considered to be amorphous.

Then, with respect to the obtained cathode active material (12), free alkali measurement was carried out in the same manner as in Example 7. The results of the alkali measurement are shown in Table 5.

Example 10

To 9.44 g of a raw material aluminum lactate aqueous solution having an aluminum (Al) content of 4.5 mass % and a pH of 4.6, 0.35 g of ammonium sulfate (($NH_4$)$_2SO_4$) and 0.21 g of distilled water were added and mixed to prepare an aqueous solution having ammonium sulfate and aluminum lactate mixed. And, in the same manner as in Example 9 except that this aqueous solution having ammonium sulfate and aluminum lactate mixed, was applied by spray coating to the lithium-containing composite oxide (C), a cathode active material (13) made of particles (III) having a covering layer containing Al and S on the surface of the lithium-containing composite oxide particles. The specific surface area of the cathode active material (13) is shown in Table 6.

Here, the value of (Z) of the cation ($Al^{3+}$) and the anion ($SO_4^{2-}$) spray-coated on the lithium-containing composite oxide (C) was 0.111.

Then, with respect to the obtained cathode active material (13), an XRD measurement and an XPS measurement were carried out in the same manner as in Example 1. Compounds having peaks detected by XRD, are shown in Table 3, and the atomic ratio ($S_{2p}/Al_{2p}$) of the non-metal element (S) to the metal element (Al) and the results of the XPS measurement are shown in Table 4.

From the results of the XRD and XPS measurements, it was confirmed that the compound containing the metal element (Al) contained in the covering layer was $Al_2O_3$, and the compound (II) containing the non-metal element (S) was $Li_2SO_4$ and $Li_2SO_4 \cdot H_2O$. Further, $Al_2O_3$ was not detected by XRD and therefore is considered to be amorphous.

Then, with respect to the obtained cathode active material (13), free alkali measurement was carried out in the same manner as in Example 7. The results of the alkali measurement are shown in Table 5.

Comparative Example 4

To 6.29 g of a raw material aluminum lactate aqueous solution having an aluminum (Al) content of 4.5 mass % and a pH of 4.6, 3.71 g of distilled water was added and mixed to prepare an aqueous aluminum lactate solution. And, in the same manner as in Example 7 except that this aqueous aluminum lactate solution was applied by spray coating to the lithium-containing composite oxide (B), a cathode active material (14) was obtained, which was made of particles (III) having a covering layer containing Al on the surface of the lithium-containing composite oxide particles. The specific surface area of the cathode active material (14) is shown in Table 6.

Here, the value of (Z) of the cation ($Al^{3+}$) and the anion ($SO_4^{2-}$) spray-coated on the lithium-containing composite oxide (B) was 0.833.

Then, with respect to the obtained cathode active material (14), an XRD measurement and an XPS measurement were carried out in the same manner as in Example 1. Compounds having peaks detected by XRD, are shown in Table 3, and the atomic ratio ($S_{2p}/Al_{2p}$) of the non-metal element (S) to the metal element (Al) and the results of the XPS measurement are shown in Table 4.

From the results of the XRD and XPS measurements, it was confirmed that the compound containing the metal element (Al) contained in the covering layer was $Al_2O_3$. Further, $Al_2O_3$ was not detected by XRD and therefore is considered to be amorphous.

Then, with respect to the obtained cathode active material (14), free alkali measurement was carried out in the same manner as in Example 7. The results of the alkali measurement are shown in Table 5.

Then, with respect to the filtrate having distilled water added, titration was conducted with 0.02 mol/L hydrochloric acid, whereby the contents of LiOH and $Li_2CO_3$ contained in the filtrate were obtained on the assumption that the titer from the initial pH to pH 8.5 corresponds to neutralization of LiOH and $Li_2CO_3$ and the titer from pH 8.5 to pH 4.0 corresponds to neutralization of $Li_2CO_3$. The ratio of the Li amount contained in LiOH in the filtrate to the Li amount contained in 1 g of the cathode material was taken as the free

TABLE 3

| Ex. | Cathode active material | Metal element | Non-metal element | Detected peak of metal element compound | Detected peak of non-metal compound |
|---|---|---|---|---|---|
| Ex. 7 | (10) | Al | S | Nil | $Li_2SO_4 + Li_2SO_4 \cdot H_2O$ |
| Ex. 8 | (11) | Al | S | Nil | $Li_2SO_4 + Li_2SO_4 \cdot H_2O$ |
| Ex. 9 | (12) | Al | S | Nil | $Li_2SO_4 + Li_2SO_4 \cdot H_2O$ |
| Ex. 10 | (13) | Al | S | Nil | $Li_2SO_4 + Li_2SO_4 \cdot H_2O$ |
| Comp. Ex. 4 | (14) | Al | Nil | Nil | Nil |

TABLE 4

| Ex. | Cathode active material | Metal element | Non-metal element | Chemical shift of $Al_{2p}$ | Atomic ratio (non-metal element/metal element) |
|---|---|---|---|---|---|
| Ex. 7 | (10) | Al | S | Agreed to $Al_2O_3$ | 0.012 |
| Ex. 8 | (11) | Al | S | Agreed to $Al_2O_3$ | 0.066 |
| Ex. 9 | (12) | Al | S | Agreed to $Al_2O_3$ | 0.050 |
| Ex. 10 | (13) | Al | S | Agreed to $Al_2O_3$ | 0.015 |
| Comp. Ex. 4 | (14) | Al | Nil | Agreed to $Al_2O_3$ | — |

TABLE 5

| Ex. | Cathode active material | Metal element | Non-metal element | Initial pH | Free LiOH ratio (mol %) | Free $Li_2CO_3$ ratio (mol %) | Free Li ratio (mol %) |
|---|---|---|---|---|---|---|---|
| Ex. 7 | (10) | Al | S | 10.5 | 0.02 | 0.62 | 0.64 |
| Ex. 8 | (11) | Al | S | 10.4 | 0.02 | 0.45 | 0.47 |
| Ex. 9 | (12) | Al | S | 10.6 | 0.03 | 0.72 | 0.75 |
| Ex. 10 | (13) | Al | S | 10.5 | 0.01 | 0.71 | 0.72 |
| Comp. Ex. 4 | (14) | Al | Nil | 10.9 | 0.25 | 0.90 | 1.15 |

TABLE 6

| | Cathode active material | Specific surface area of cathode active material [m²/g] |
|---|---|---|
| Ex. 1 | (1) | 2.4 |
| Ex. 2 | (2) | 2.5 |
| Ex. 3 | (3) | 2.5 |
| Ex. 4 | (4) | 2.8 |
| Ex. 5 | (5) | 2.4 |
| Ex. 6 | (6) | 2.5 |
| Comp. Ex. 1 | (7) | 2.6 |
| Comp. Ex. 2 | (8) | 2.4 |
| Comp. Ex. 3 | (9) | 2.8 |
| Ex. 7 | (10) | 6.7 |
| Ex. 8 | (11) | 6.9 |
| Ex. 9 | (12) | 8.7 |
| Ex. 10 | (13) | 9.2 |
| Comp. Ex. 4 | (14) | 6.6 |

<Free Alkali Measurement>

1 g of a cathode material was dispersed in 10 g of distilled water, followed by stirring for 30 minutes and then by filtration through a membrane filter. To the filtrate, 60 g of distilled water was further added, whereupon the pH was measured. The pH at that time is taken as the initial pH.

LiOH ratio. The ratio of the Li amount contained in $Li_2CO_3$ in the filtrate to the Li amount contained in 1 g of the cathode material was taken as the free $Li_2CO_3$ ratio. The sum of the free LiOH ratio and the free $Li_2CO_3$ ratio was taken as the free Li ratio.

<XRD Measurement>

For the XRD measurement, RINT-TTR-III, trade name, manufactured by Rigaku Corporation, was used as an X-ray diffraction apparatus. As the X-ray source, CuKα ray was used. The measurement was conducted under such conditions that the voltage was 50 kV, the tube current was 300 mA, the scan axis was 2θ/θ, the measuring range was 2θ=20 to 36°, the sampling width was 0.04°, and the scanning speed was 0.2°/min.

<XPS Measurement>

A sample was prepared by densely transferring the cathode active material on a carbon tape. In the XPS measurement, using an X-ray photoelectron spectroscopic apparatus Model 5500 manufactured by PHI (radiation source: AlKα, monochromatic), peaks on the low energy side of C1s are deemed to be contamination and adjusted at 284.8 eV. The measured area was within a circle with a diameter of about 800 μm. The measurement was conducted under such conditions that the wide scan pulse energy was 93.9 eV and step energy was 0.8 eV, and the narrow scan (FIGS. 2 and 3) pulse energy was 23.5 eV and step energy was 0.05 eV.

[Production of Cathode Sheet]

One of cathode active materials (1) to (9) obtained in Examples 1 to 6 and Comparative Examples 1 to 3, acetylene black as electrically conductive material and a solution (solvent: N-methylpyrrolidone) containing 12.1 mass % of polyvinylidene fluoride (binder), were mixed, and N-methylpyrrolidone was further added to prepare a slurry. At that time, the mass ratio of the cathode active material, acetylene black and polyvinylidene fluoride was made to be 82:10:8.

Likewise, the mass ratio of one of cathode active materials (10) to (14) obtained in Examples 7 to 10 and Comparative Example 4, acetylene black and polyvinylidene fluoride was made to be 80:10:10.

Then, the slurry was applied on one side of an aluminum foil (cathode current collector) having a thickness of 20 µm by means of a doctor blade, followed by drying at 120° C. and then by roll pressing twice to prepare a cathode sheet. Here, cathode sheets obtained from the cathode active materials (1) to (14) are designated as cathode sheets 1 to 14, respectively.

[Production of Lithium Ion Secondary Battery]

Using as a cathode one of the cathode sheets 1 to 14 obtained as described above, a stainless steel simple sealed cell type lithium ion secondary battery was assembled in an argon globe box. Here, a metal lithium foil having a thickness of 500 µm was used as an anode, a stainless steel plate having a thickness of 1 mm was used as an anode current collector, and a porous polypropylene having a thickness of 25 µm was used as a separator. Further, as an electrolytic solution, $LiPF_6$ at a concentration of 1 mol/dm$^3$/EC (ethylene carbonate)+DEC (diethyl carbonate) (1:1) solution (which means a mixed solution having $LiPF_6$ as a solute dissolved in EC and DEC in a volume ratio (EC:DEC=1:1)) was used.

Here, lithium ion secondary batteries employing the cathode sheets 1 to 14, respectively, are designated as batteries 1 to 14, respectively.

[Evaluations of Lithium Ion Secondary Batteries]

With respect to the batteries 1 to 9 produced as described above, the following evaluations were carried out.

(Initial Capacity)

Charging to 4.7 V was conducted with a load current of 200 mA per 1 g of the cathode active material, and then discharging to 2.5 V was conducted with a load current of 50 mA per 1 g of the cathode active material. Then, charging to 4.3 V was conducted with a load current of 200 mA per 1 g of the cathode active material, and then discharging to 2.5 V was conducted with a load current of 100 mA per 1 g of the cathode active material.

With respect to batteries 1 to 9 subjected to such charge and discharge, charging to 4.6 V was continuously conducted with a load current of 200 mA per 1 g of the charge/discharge cathode active material, and then discharging to 2.5 V was conducted with a load current of 100 mA per 1 g of the cathode active material. At that time, the discharge capacity of the cathode active material at from 4.6 to 2.5 V was taken as the initial capacity at 46 V.

(Rate Characteristics)

After the evaluation of the initial capacity at 4.6 V, charging to 4.6 V was conducted with a load current of 200 mA per 1 g of the charge/discharge cathode active material, and high rate discharging to 2.5 V was conducted with a load current of 1,000 mA per 1 g of the cathode active material. At that time, the discharge capacity of the cathode active material at from 4.6 to 2.5 V in the high rate discharging was divided by the initial capacity at 4.6 V to obtain a value, and this value was taken as a rate retention.

(Cycle Characteristics)

A charge/discharge cycle of charging to 4.6 V with a load current of 200 mA per 1 g of the charge/discharge cathode active material and high rate discharging to 2.5 V with a load current of 100 mA per 1 g of the cathode active material, was repeated 50 times. At that time, the discharge capacity in the 50th charge/discharge cycle at 4.6 V was divided by the initial capacity at 4.6 V to obtain a value, and this value was taken as the cycle retention.

The results of evaluation of the above initial capacity at 4.6 V, rate retention and cycle retention with respect to the batteries 1 to 9, are shown in Table 7.

TABLE 7

| | Cathode active material | Metal element | Non-metal element | (Z) | Initial capacity of 4.6 V (mAh/g) | Rate retention (%) | Cycle retention (%) |
|---|---|---|---|---|---|---|---|
| Battery 1 | (1) | Al | S | 0.33 | 220 | 74 | 90 |
| Battery 2 | (2) | Al | S | 0.53 | 225 | 75 | 93 |
| Battery 3 | (3) | Al | S | 0.67 | 221 | 72 | 92 |
| Battery 4 | (4) | Al | S | 0.33 | 215 | 69 | 95 |
| Battery 5 | (5) | Y | S | 0.33 | 218 | 70 | 90 |
| Battery 6 | (6) | Al | B | 0.50 | 219 | 68 | 93 |
| Battery 7 | (7) | Nil | Nil | — | 216 | 65 | 78 |
| Battery 8 | (8) | Al | Nil | — | 205 | 63 | 84 |
| Battery 9 | (9) | Al | S | 1.15 | 210 | 63 | 80 |

With respect to the batteries 10 to 14 produced as described above, the following evaluations were carried out.

(Initial Capacity)

Charging to 4.6 V was conducted with a load current of 20 mA per 1 g of the cathode active material, and then discharging to 2.0 V was conducted with a load current of 20 mA per 1 g of the cathode active material. At that time, the discharge capacity of the cathode active material at from 4.6 to 2.0 V was taken as the initial capacity at 46 V.

(Cycle Characteristics)

Then, a charge/discharge cycle of charging to 4.5 V with a load current of 200 mA per 1 g of the charge/discharge cathode active material and high rate discharging to 2.0 V with a load current of 200 mA per 1 g of the cathode active material, was repeated 100 times. At that time, the discharge capacity in the 100th charge/discharge cycle at 4.5 V was divided by the discharge capacity in the 1st charge/discharge cycle at 4.5 V to obtain a value, and this value was taken as the cycle retention.

The results of evaluation of the above initial capacity at 4.6 V and cycle retention with respect to the batteries 10 to 14, are shown in Table 8.

TABLE 8

| Ex. | Cathode active material | Metal element | Non-metal element | (Z) | Initial capacity of 4.6 V (mAh/g) | Cycle retention (%) |
|---|---|---|---|---|---|---|
| Battery 10 | (10) | Al | S | 0.167 | 270 | 88 |
| Battery 11 | (11) | Al | S | 0.5 | 267 | 88 |
| Battery 12 | (12) | Al | S | 0.167 | 271 | 86 |
| Battery 13 | (13) | Al | S | 0.111 | 269 | 87 |
| Battery 14 | (14) | Al | Nil | — | 272 | 78 |

From Table 7, it is evident that, as compared with the lithium batteries 7 to 9 employing the cathode active materials (7) to (9) in Comparative Examples 1 to 3, the lithium batteries 1 to 6 employing the cathode active materials (1) to (6) in Examples 1 to 6 have high initial capacities, are excellent in rate retention and yet have a high cycle retention of at least 90%.

Accordingly it is evident that in a case where a cathode is prepared by using the cathode active material for a lithium ion secondary battery in the first embodiment of the present invention and a lithium ion secondary battery is constituted by using this cathode, the initial capacity will be high, and it is possible to obtain an excellent rate retention and cycle retention.

As shown in Table 5, the lithium batteries 10 to 13 employing the cathode active materials (10) to (13) have a low pH and a low free Li ratio when the cathode active material is dispersed in water, as compared with the cathode active material (14) in Comparative Example 4. Accordingly, the cathode active materials (10) to (13) are less likely to bring about a problem such as an increase in viscosity of the slurry or gelation of the slurry in a step of forming a cathode sheet.

From Table 8, it is evident that, as compared with the lithium battery 14 employing the cathode active materials (14) in Comparative Example 4, the lithium batteries 10 to 13 employing the cathode active materials (10) to (13) in Examples 7 to 10 have a high cycle retention although the initial capacity is at the same level.

Accordingly it is evident that in a case where a cathode is prepared by using the cathode active material for a lithium ion secondary battery in the second embodiment of the present invention, a problem of gelation is less likely to occur, and in a case where a lithium ion secondary battery is constituted by using this cathode, it is possible to obtain an excellent cycle retention.

INDUSTRIAL APPLICABILITY

According to the present invention, it is possible to obtain a cathode active material for a lithium ion secondary battery, which has a high discharge capacity per unit mass and which is excellent in cycle characteristics and rate characteristics. This cathode active material is useful for a small sized light weight lithium ion secondary battery for electronic instruments such as cell phones or for vehicles.

This application is a continuation of PCT Application No. PCT/JP2012/069902, filed on Aug. 3, 2012, which is based upon and claims the benefit of priority from Japanese Patent Application No. 2011-172126 filed on Aug. 5, 2011. The contents of those applications are incorporated herein by reference in its entirety.

What is claimed is:

1. A cathode active material, comprising particles having a covering layer,
wherein:
the covering layer comprises:
(i) a metal oxide comprising Al, and
(ii) a compound comprising Li and at least one non-metal element selected from the group consisting of S and B;
the covering layer is disposed on a surface of a lithium-containing composite oxide comprising lithium and a transition metal element;
an atomic ratio of the non-metal element to the Al present within 5 nm of a surface of the particles is in a range of 0.10 to 0.25; and
the particles have a free Li ratio of at most 0.8 mol %.

2. The cathode active material of claim 1, wherein a specific surface area of the particles is at least 0.1 m$^2$/g and less than 3 m$^2$/g.

3. The cathode active material of claim 1, wherein the metal oxide further comprises at least one element selected from the group consisting of Y, Ga, La, Gd and Er.

4. The cathode active material of claim 1, wherein the compound is at least one compound selected from the group consisting of $Li_2SO_4$ and $Li_2SO_4 \cdot H_2O$.

5. The cathode active material of claim 1, wherein a molar ratio of the Al to the lithium-containing composite oxide is in a range of 0.001 to 0.03.

6. The cathode active material of claim 1, wherein the particles have a free Li ratio of 0.2 to 0.8 mol %.

7. A cathode comprising the cathode active material of claim 1, and a binder.

8. A lithium ion secondary battery comprising the cathode of claim 7, an anode and a non-aqueous electrolyte.

9. A cathode comprising the cathode active material of claim 1, and a binder,
wherein the non-metal element in the compound has a concentration gradient such that a concentration of the non-metal element decreases from the surface of the particles towards the center of the particles.

10. A process for producing the cathode active material of claim 1, comprising:
contacting a powder of a lithium-containing composite oxide comprising lithium and a transition metal element with a first aqueous solution comprising a cation (p) having Al and which does not comprise an anion (n) having at least one non-metal element selected from the group consisting of S and B,
contacting the powder of the lithium-containing composite oxide with a second aqueous solution comprising the anion (n), provided that the second aqueous solution may or may not comprise the cation (p), and
heating, after the first and second contacting, the obtained treated powder of the lithium-containing composite oxide to a temperature of from 250 to 700° C.,
wherein in the entire aqueous solution having the first and second aqueous solutions put together, |(number of moles of said anion contained in said second aqueous solution×valency of said anion)|/((number of moles of said cation contained in said first aqueous solution×valency of said cation)+(number of moles of said cation contained in said second aqueous solution×valency of said cation)) is less than 1.

11. The process of claim 10, wherein the first contacting and the second contacting are performed simultaneously.

12. The process of claim 10, wherein the cation (p) is $Al^{3+}$, and the anion (n) comprises $SO_4^{2-}$ or $B_3^{3-}$.

13. The process of claim 10, wherein the solvent in the aqueous solutions is water only.

14. The process of claim 10, wherein the first and second contacting comprises applying the aqueous solution by spray coating to the powder of the lithium-containing composite oxide.

15. A cathode active material, comprising particles having a covering layer,
wherein:
the covering layer comprises:
(i) a metal oxide comprising Al, and
(ii) a compound comprising Li and at least one non-metal element selected from the group consisting of S and B;
the covering layer is disposed on a surface of a lithium-containing composite oxide comprising lithium and a transition metal element;
an atomic ratio of the non-metal element to the Al present within 5 nm of a surface of the particles is in a range of 0.01 to 0.1;
the particles have a free Li ratio of at most 0.8 mol %; and
a specific surface area of the particles is at least 3 m$^2$/g and at most 10 m$^2$/g.

16. The cathode active material of claim 15, wherein the metal oxide further comprises at least one element selected from the group consisting of Y, Ga, La, Gd and Er.

17. The cathode active material of claim 15, wherein the compound is at least one compound selected from the group consisting of $Li_2SO_4$ and $Li_2SO_4 \cdot H_2O$.

18. The cathode active material of claim 15, wherein a molar ratio of the Al to the lithium-containing composite oxide is in a range of 0.001 to 0.03.

19. The cathode active material of claim 15, wherein the particles have a free Li ratio of 0.2 to 0.8 mol %.

20. A cathode comprising the cathode active material of claim 15, and a binder.

21. A lithium ion secondary battery comprising the cathode of claim 10, an anode and a non-aqueous electrolyte.

22. A cathode comprising the cathode active material of claim 15, and a binder,
  wherein the non-metal element in the compound has a concentration gradient such that a concentration of the non-metal element decreases from the surface of the particles towards the center of the particles.

* * * * *